(12) United States Patent
Shimomura

(10) Patent No.: US 12,126,565 B2
(45) Date of Patent: *Oct. 22, 2024

(54) WIRELESS COMMUNICATION SYSTEM, BASE STATION, TERMINAL, AND METHOD OF COMMUNICATION

(71) Applicant: FUJITSU LIMITED, Kawasaki (JP)

(72) Inventor: Tsuyoshi Shimomura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/377,369

(22) Filed: Oct. 6, 2023

(65) Prior Publication Data
US 2024/0048331 A1 Feb. 8, 2024

Related U.S. Application Data

(63) Continuation of application No. 16/923,830, filed on Jul. 8, 2020, now Pat. No. 11,811,696, which is a
(Continued)

(51) Int. Cl.
*H04L 5/00* (2006.01)
*H04W 28/06* (2009.01)
(Continued)

(52) U.S. Cl.
CPC ........... *H04L 5/0053* (2013.01); *H04W 28/06* (2013.01); *H04W 72/21* (2023.01); *H04W 72/23* (2023.01); *H04W 76/27* (2018.02)

(58) Field of Classification Search
None
See application file for complete search history.

(56) References Cited

U.S. PATENT DOCUMENTS

| 10,523,397 | B2 | 12/2019 | Park et al. |
| 2011/0274043 | A1 | 11/2011 | Nam et al. |

(Continued)

FOREIGN PATENT DOCUMENTS

| JP | 2013-526231 A | 6/2013 |
| JP | 2017-539182 A | 12/2017 |
| WO | 2011139068 A2 | 11/2011 |

OTHER PUBLICATIONS

3GPP TS 36.213 V14.4.0, "3rd Generation Partnership Project; Technical Specification Group Radio Access Network; Evolved Universal Terrestrial Radio Access (E-UTRA); Physical layer procedures (Release 14)", Sep. 2017.
(Continued)

*Primary Examiner* — Srinivasa R Reddivalam
(74) *Attorney, Agent, or Firm* — Myers Wolin, LLC

(57) ABSTRACT

A wireless communication system includes: a base station that transmits a first signal including information indicating whether the control information is able to be transmitted using the channel assigned to the transmission of the data; and a terminal that receives the first signal. In a case that the timing of transmitting the data and the timing of transmitting the control information overlap with each other, the terminal transmits, when the information in the first signal indicates that the control information is not able to be transmitted using the channel, the control information to the base station using a resource other than the channel, and transmits, when the information in the first signal indicates that the control information is able to be transmitted using the channel, the control information to the base station using the channel.

11 Claims, 12 Drawing Sheets

Related U.S. Application Data continuation of application No. PCT/JP2018/000540, filed on Jan. 11, 2018.

(51) Int. Cl.
| | | |
|---|---|---|
| *H04W 72/21* | (2023.01) | |
| *H04W 72/23* | (2023.01) | |
| *H04W 76/27* | (2018.01) | |

(56) References Cited

U.S. PATENT DOCUMENTS

| | | |
|---|---|---|
| 2013/0230004 A1 | 9/2013 | Nam et al. |
| 2016/0242166 A1 | 8/2016 | Nam et al. |
| 2018/0006790 A1 | 1/2018 | Park et al. |
| 2019/0037586 A1 | 1/2019 | Park et al. |
| 2019/0116611 A1 | 4/2019 | Lee et al. |
| 2019/0223201 A1 | 7/2019 | Lee et al. |
| 2020/0112417 A1 | 4/2020 | Park et al. |
| 2020/0236669 A1 | 7/2020 | Takeda et al. |
| 2021/0092756 A1 | 3/2021 | Takeda et al. |
| 2021/0135791 A1 | 5/2021 | Wang et al. |
| 2021/0143960 A1 | 5/2021 | Shimezawa et al. |
| 2021/0307047 A1 | 9/2021 | Lin et al. |

OTHER PUBLICATIONS

3GPP TS 36.331 V14.4.0, "3rd Generation Partnership Project; Technical Specification Group Radio Access Network; Evolved Universal Terrestrial Radio Access (E-UTRA); Radio Resource Control (RRC); Protocol specification (Release 14)", Sep. 2017.
3GPP TS 36.413 V14.4.0, "3rd Generation Partnership Project; Technical Specification Group Radio Access Network; Evolved Universal Terrestrial Radio Access Network (E-UTRAN); S1 Application Protocol (S1AP) (Release 14)", Sep. 2017.
3GPP TS 36.423 V14.4.0, "3rd Generation Partnership Project; Technical Specification Group Radio Access Network; Evolved Universal Terrestrial Radio Access Network (E-UTRAN); X2 application protocol (X2AP) (Release 14)", Sep. 2017.
3GPP TS 36.425 V14.0.0, "3rd Generation Partnership Project; Technical Specification Group Radio Access Network; Evolved Universal Terrestrial Radio Access Network (E-UTRAN); X2 interface user plane protocol (Release 14)", Mar. 2017.
3GPP TS 37.340 V2.0.0, "3rd Generation Partnership Project; Technical Specification Group Radio Access Network; Evolved Universal Terrestrial Radio Access (E-UTRA) and NR; Multi-connectivity; Stage 2 (Release 15)". Dec. 2017.
3GPP TS 38.201 V2.0.0, "3rd Generation Partnership Project; Technical Specification Group Radio Access Network; NR; Physical layer; General description (Release 15)", Dec. 2017.
3GPP TS 38.202 V2.0.0, "3rd Generation Partnership Project; Technical Specification Group Radio Access Network; NR; Services provided by the physical layer (Release 15)", Dec. 2017.
3GPP TS 38.211 V2.0.0, "3rd Generation Partnership Project; Technical Specification Group Radio Access Network; NR; Physical channels and modulation (Release 15)", Dec. 2017.
3GPP TS 38.212 V1.2.1, "3rd Generation Partnership Project; Technical Specification Group Radio Access Network; NR; Multiplexing and channel coding (Release 15)", Dec. 2017.
3GPP TS 38.213 V2.0.0, "3rd Generation Partnership Project; Technical Specification Group Radio Access Network; NR; Physical layer procedures for control (Release 15)", Dec. 2017.
3GPP TS 38.214 V2.0.0, "3rd Generation Partnership Project; Technical Specification Group Radio Access Network; NR; Physical layer procedures for data (Release 15)", Dec. 2017.
3GPP TS 38.215 V2.0.0, "3rd Generation Partnership Project; Technical Specification Group Radio Access Network; NR; Physical layer measurements (Release 15)", Dec. 2017.
3GPP TS 38.300 V2.0.0, "3rd Generation Partnership Project; Technical Specification Group Radio Access Network; NR; NR and NG-RAN Overall description; Stage 2 (Release 15)", Dec. 2017.
3GPP TS 38.321 V2.0.0, "3rd Generation Partnership Project; Technical Specification Group Radio Access Network; NR; Medium Access Control (MAC) protocol specification (Release 15)", Dec. 2017.
3GPP TS 38.322 V2.0.0, "3rd Generation Partnership Project; Technical Specification Group Radio Access Network; NR; Radio Link Control (RLC) protocol specification (Release 15)", Dec. 2017.
3GPP TS 38.323 V2.0.0, "3rd Generation Partnership Project; Technical Specification Group Radio Access Network; NR; Packet Data Convergence Protocol (PDCP) specification (Release 15)", Dec. 2017.
3GPP TS 38.331 V0.4.0, "3rd Generation Partnership Project; Technical Specification Group Radio Access Network; NR; Radio Resource Control (RRC) Protocol specification (Release 15)", Dec. 2017.
3GPP TS 38.401 V1.0.0, "3rd Generation Partnership Project; Technical Specification Group Radio Access Network; NG-RAN; Architecture description (Release 15)", Dec. 2017.
3GPP TS 38.410 V0.6.0, "3rd Generation Partnership Project; Technical Specification Group Radio Access Network; NG-RAN; NG general aspects and principles (Release 15)", Dec. 2017.
3GPP TS 38.413 V0.5.0, "3rd Generation Partnership Project; Technical Specification Group Radio Access Network; NG Radio Access Network (NG-RAN); NG Application Protocol (NGAP) (Release 15)", Dec. 2017.
3GPP TS 38.420 V0.5.0, "3rd Generation Partnership Project; Technical Specification Group Radio Access Network; NG-RAN; Xn general aspects and principles (Release 15)", Dec. 2017.
3GPP TS 38.423 V0.5.0, "3rd Generation Partnership Project; Technical Specification Group Radio Access Network; NG Radio Access Network (NG-RAN); Xn application protocol (XnAP) (Release 15)", Dec. 2017.
3GPP TS 38.470 V1.0.0, "3rd Generation Partnership Project; Technical Specification Group Radio Access Network; NG-RAN; F1 general aspects and principles (Release 15)", Dec. 2017.
3GPP TS 38.473 V1.0.0, "3rd Generation Partnership Project; Technical Specification Group Radio Access Network; NG-RAN; F1 application protocol (F1AP) (Release 15)", Dec. 2017.
3GPP TR 38.801 V14.0.0, "3rd Generation Partnership Project; Technical Specification Group Radio Access Network; Study on new radio access technology; Radio access architecture and interfaces (Release 14)", Mar. 2017.
3GPP TR 38.802 V14.2.0, "3rd Generation Partnership Project; Technical Specification Group Radio Access Network, Study on New Radio Access Technology; Physical Layers Aspects (Release 14)", Sep. 2017.
3GPP TR 38.803 V14.2.0, "3rd Generation Partnership Project; Technical Specification Group Radio Access Network; Study on new radio access technology; Radio Frequency (RF) and co-existence aspects (Release 14)", Sep. 2017.
3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.
3GPP TR 38.900 V14.3.1, "3rd Generation Partnership Project; Technical Specification Group Radio Access Network; Study on channel model for frequency spectrum above 6 GHz (Release 14)", Jul. 2017.
3GPP TR 38.912 V14.1.0, "3rd Generation Partnership Project; Technical Specification Group Radio Access Network; Study on New Radio (NR) access technology (Release 14)", Jun. 2017.
3GPP TR 38.913 V14.3.0, "3rd Generation Partnership Project; Technical Specification Group Radio Access Network; Study on Scenarios and Requirements for Next Generation Access Technologies (Release 14)", Jun. 2017.
International Search Report with Written Opinion issued for corresponding International Patent Application No. PCT/JP2018/000540, dated Mar. 27, 2018. English translations attached.
3GPP TS 36.211 V14.4.0, 3rd Generation Partnership Project; Technical Specification Group Radio Access Network; Evolved Universal Terrestrial Radio Access (E-UTRA); Physical channels and modulation (Release 14); Sep. 2017.

(56) References Cited

OTHER PUBLICATIONS

3GPP TS 36.212 V14.4.0, 3rd Generation Partnership Project; Technical Specification Group Radio Access Network; Evolved Universal Terrestrial Radio Access (E-UTRA); Multiplexing and channel coding (Release 14); Sep. 2017.
Source: LG Electronics; Agenda Item: 6.2.2.1.4; Title: UCI transmission on PUSCH for Rel-13 CA; Document for: Discussion and decision; 3GPP TSG RAN WG1 Meeting #83; Anaheim, USA Nov. 15-22, 2015; R1-156853.
3GPP TS 36.300 V14.4.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14); Sep. 2017.
3GPP TS 36.321 V14.4.0, 3rd Generation Partnership Project; Technical Specification Group Radio Access Network; Evolved Universal Terrestrial Radio Access (E-UTRA); Medium Access Control (MAC) protocol specification (Release 14); Sep. 2017.
3GPP TS 36.322 V14.1.0, 3rd Generation Partnership Project; Technical Specification Group Radio Access Network; Evolved Universal Terrestrial Radio Access (E-UTRA); Radio Link Control (RLC) protocol specification (Release 14); Sep. 2017.
3GPP TS 36.323 V14.4.0 3rd Generation Partnership Project; Technical Specification Group Radio Access Network; Evolved Universal Terrestrial Radio Access (E-UTRA); Packet Data Convergence Protocol (PDCP) specification (Release 14); Sep. 2017.
Source: Huawei, HiSilicon; Agenda Item 7.3.2.3; Title: On UCI multiplexing; Document for: Discussion and decision; 3GPP TSG RAN WG1 Meeting #91, Reno, USA, Nov. 27-Dec. 1, 2017; R1-1719397.
Non-Final Office Action issued by the United States Patent and Trademark Office for corresponding U.S. Appl. No. 16/923,830 electronically delivered on Dec. 22, 2021.
Final Office Action issued by the United States Patent and Trademark Office for corresponding U.S. Appl. No. 16/923,830 electronically delivered on Aug. 29, 2022.
Non-Final Office Action issued by the United States Patent and Trademark Office for corresponding U.S. Appl. No. 16/923,830 electrically delivered on Dec. 22, 2022.
Notice of Allowance issued by the United States Patent and Trademark Office for corresponding U.S. Appl. No. 16/923,830 electronically delivered on Jul. 6, 2023.

FIG.4

| VALUE | CONTENTS |
|---|---|
| "0" | UCI IS PIGGYBACKED |
| "1" | UCI IS NOT PIGGYBACKED |

FIG.5

| VALUE | CONTENTS |
|---|---|
| "00" | TRANSMIT UCI BY RESOURCE ASSIGNED TO UL data |
| "01" | UCI IS NOT PIGGYBACKED |
| "10" | TRANSMIT UCI BY PUSCH RESOURCE AFTER RESOURCE ASSIGNED TO UL data |
| "11" | TRANSMIT UCI BY PUCCH RESOURCE AFTER RESOURCE ASSIGNED TO UL data |

FIG.6

| $I_{offset,0}^{HARQ-ACK}$ or $I_{offset,1}^{HARQ-ACK}$ or $I_{offset,2}^{HARQ-ACK}$ | $\beta_{offset}^{HARQ-ACK}$ |
|---|---|
| 0 | 1.000 |
| 1 | 2.000 |
| 2 | 2.500 |
| 3 | 3.125 |
| 4 | 4.000 |
| 5 | 5.000 |
| 6 | 6.250 |
| 7 | 8.000 |
| 8 | 10.000 |
| 9 | 12.625 |
| 10 | 15.875 |
| 11 | 20.000 |
| 12 | 31.000 |
| 13 | 50.000 |
| 14 | 80.000 |
| 15 | 126.000 |
| 16 | Reserved |
| 17 | Reserved |
| 18 | Reserved |
| 19 | Reserved |
| 20 | Reserved |
| 21 | Reserved |
| 22 | Reserved |
| 23 | Reserved |
| 24 | Reserved |
| 25 | Reserved |
| 26 | Reserved |
| 27 | Reserved |
| 28 | Reserved |
| 29 | Reserved |
| 30 | Reserved |
| 31 | Reserved |

FIG.7

| UCI offset indicator | ($I_{offset,0}^{HARQ-ACK}$) or ($I_{offset,1}^{HARQ-ACK}$) or ($I_{offset,2}^{HARQ-ACK}$), ($I_{offset,0}^{CSI-1}$) or ($I_{offset,0}^{CSI-2}$), ($I_{offset,1}^{CSI-1}$) or ($I_{offset,1}^{CSI-2}$) |
|---|---|
| "00" | 1st offset index |
| "01" | 2nd offset index |
| "10" | 3rd offset index |
| "11" | 4th offset index |

WIRELESS COMMUNICATION SYSTEM, BASE STATION, TERMINAL, AND METHOD OF COMMUNICATION

CROSS-REFERENCE TO RELATED APPLICATION

This application is a continuation of U.S. application Ser. No. 16/923,830 filed on Jul. 8, 2020, which is a continuation of International Application No. PCT/JP2018/000540, filed on Jan. 11, 2018, the entire contents of each are incorporated herein by reference.

FIELD

The embodiments discussed herein are related to a wireless communication system, a base station, a terminal, and a method of communication.

BACKGROUND

In current networks, the traffic of mobile terminals (smartphones, for example) occupies most of network resources. The traffic used by a mobile terminal (hereinafter, denoted as "the terminal") tends to increase in the future.

Meanwhile, in accordance with development of Internet of Things (IoT) services (traffic systems, smart meters, and monitoring systems for apparatuses and the like, for example), readiness for services having various requirements is demanded. Given these circumstances, in next generation (the 5th generation mobile communication (5G), for example) communication standards, technologies achieving higher data rate, larger capacity, and lower latency are demanded in addition to the 4th generation mobile communication (4G) standard technologies (Non-Patent document 1-11, for example). The next generation communication standards are technically under study by working groups of 3rd Generation Partnership Project (3GPP) (TSG-RAN WG1, TSG-RAN WG2, and the like, for example) (Non-Patent document 12-38, for example).

5G supports various kinds of services. 5G assumes support of many use cases classified into enhanced Mobile Broadband (eMBB), massive Machine Type Communications (MTC), and Ultra-Reliable and Low Latency Communications (URLLC), for example.

URLLC as one of the use cases demands ultra-high reliability with an error rate of $10^{-5}$. As a method achieving the ultra-high reliability, there is a method that increases a use resource amount to provide data with redundancy. However, there is a limit to wireless resources, and use resources are unable to be limitlessly increased.

URLLC, as to low latency, aims at a user plane latency in an uplink and a downlink of 0.5 millisecond. This is a high demand of being less than $\frac{1}{10}$ of that of Long Term Evolution (LTE) as the 4G wireless communication system.

Thus, URLLC demands simultaneous fulfillment of the ultra-high reliability and low latency described above.

In a 4G wireless communication system, a terminal transmits data to a base station by a physical uplink shared channel (PUSCH), for example. In the following, the data transmitted by the uplink is denoted as uplink data. The terminal transmits control information to the base station by a physical uplink control channel (PUCCH). In the following, the control information transmitted by the uplink is denoted as uplink control information (UCI). When the uplink data and the UCI are simultaneously transmitted, the uplink data and the UCI may be transmitted by the PUSCH.

The UCI includes acknowledgement (ACK)/negative-acknowledgement (NACK) as delivery confirmation information for data transmitted by the downlink. In the following, the data transmitted by the downlink is denoted as downlink data. The UCI includes scheduling request (SR) requesting assignment of a transmission resource and periodic or aperiodic channel state information (CSI).

The CSI includes a channel quality indicator (CQI) and a precoding matrix indicator (PMI). The periodic CSI corresponds to a case (periodic reporting) in which a periodic transmission resource is assigned in advance by radio resource control (RRC). The aperiodic CSI corresponds to a case (aperiodic reporting) in which transmission is performed based on a command of a physical downlink control channel (PDCCH).

In the 4G wireless communication system, the base station transmits the data (the downlink data) to the terminal by a physical downlink shared channel (PDSCH), for example. The base station transmits the control information to the terminal by the PDCCH. In the following, the control information transmitted by the downlink is denoted as downlink control information (DCI).

The DCI includes information on UL grant (PUSCH assignment information) and DL assignment (PDSCH assignment information), for example, and is presented as DCI Format in the technical standards (3GPP TS36.212 V14.4.0, September 2017 and 3GPP T538.213 V2.0.0, December 2017).

In the 4G wireless communication system, when a transmission timing of the UCI and a transmission timing of the data overlap with each other, the terminal transmits the UCI piggybacked on the PUSCH (transmits the UCI carried on the PUSCH). Also in the 5G communication standards, discussions are developing in line with employment of transmission of the UCI piggybacked on the PUSCH by the terminal when a transmission timing of the UCI and a transmission timing of the data overlap with each other.

Non-Patent document 1: 3GPP TS36.211 V14.4.0, September 2017
  Non-Patent document 2: 3GPP TS36.212 V14.4.0, September 2017
  Non-Patent document 3: 3GPP TS36.213 V14.4.0, September 2017
  Non-Patent document 4: 3GPP TS36.300 V14.4.0, September 2017
  Non-Patent document 5: 3GPP TS36.321 V14.4.0, September 2017
  Non-Patent document 6: 3GPP TS36.322 V14.1.0, September 2017
  Non-Patent document 7: 3GPP TS36.323 V14.4.0, September 2017
  Non-Patent document 8: 3GPP TS36.331 V14.4.0, September 2017
  Non-Patent document 9: 3GPP TS36.413 V14.4.0, September 2017
  Non-Patent document 10: 3GPP TS36.423 V14.4.0, September 2017
  Non-Patent document 11: 3GPP TS36.425 V14.0.0, March 2017
  Non-Patent document 12: 3GPP TS37.340 V2.0.0, December 2017
  Non-Patent document 13: 3GPP TS38.201 V2.0.0, December 2017
  Non-Patent document 14: 3GPP TS38.202 V2.0.0, December 2017
  Non-Patent document 15: 3GPP TS38.211 V2.0.0, December 2017

Non-Patent document 16: 3GPP TS38.212 V1.2.1, December 2017

Non-Patent document 17: 3GPP TS38.213 V2.0.0, December 2017

Non-Patent document 18: 3GPP TS38.214 V2.0.0, December 2017

Non-Patent document 19: 3GPP TS38.215 V2.0.0, December 2017

Non-Patent document 20: 3GPP TS38.300 V2.0.0, December 2017

Non-Patent document 21: 3GPP TS38.321 V2.0.0, December 2017

Non-Patent document 22: 3GPP TS38.322 V2.0.0, December 2017

Non-Patent document 23: 3GPP TS38.323 V2.0.0, December 2017

Non-Patent document 24: 3GPP TS38.331 V0.4.0, December 2017

Non-Patent document 25: 3GPP TS38.401 V1.0.0, December 2017

Non-Patent document 26: 3GPP TS38.410 V0.6.0, December 2017

Non-Patent document 27: 3GPP TS38.413 V0.5.0, December 2017

Non-Patent document 28: 3GPP TS38.420 V0.5.0, December 2017

Non-Patent document 29: 3GPP TS38.423 V0.5.0, December 2017

Non-Patent document 30: 3GPP TS38.470 V1.0.0, December 2017

Non-Patent document 31: 3GPP TS38.473 V1.0.0, December 2017

Non-Patent document 32: 3GPP TR38.801 V14.0.0, April 2017

Non-Patent document 33: 3GPP TR38.802 V14.2.0, September 2017

Non-Patent document 34: 3GPP TR38.803 V14.2.0, September 2017

Non-Patent document 35: 3GPP TR38.804 V14.0.0, April 2017

Non-Patent document 36: 3GPP TR38.900 V14.3.1, July 2017

Non-Patent document 37: 3GPP TR38.912 V14.1.0, June 2017

Non-Patent document 38: 3GPP TR38.913 V14.3.0, June 2017

By the way, when the terminal transmits the UCI piggybacked on the PUSCH when the transmission timing of the control information (UCI) and the transmission timing of the data overlap with each other, the proportion of the uplink data in the PUSCH is small. Thus, the redundancy of the PUSCH is insufficient to worsen an error rate. When data for URLLC, which demands high reliability, is transmitted in the 5G wireless communication system, for example, there is a possibility that a resource to be assigned to the data for URLLC is not ensured, and a demanded error rate is not fulfilled.

SUMMARY

According to an aspect of an embodiment, a wireless communication system includes: a base station that transmits a first signal including information indicating whether the control information is able to be transmitted using the channel assigned to the transmission of the data; and a terminal that receives the first signal including the information indicating whether the control information is able to be transmitted using the channel assigned to the transmission of the data. In a case that the timing of transmitting the data and the timing of transmitting the control information overlap with each other, the terminal transmits, when the information in the first signal indicates that the control information is not able to be transmitted using the channel, the control information to the base station using a resource other than the channel, and transmits, when the information in the first signal indicates that the control information is able to be transmitted using the channel, the control information to the base station using the channel.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an illustrative diagram of an exemplary method using an exclusive field (in the case of 1 bit) in a physical downlink control channel (PDCCH) in the wireless communication system according to the first embodiment;

FIG. 5 is an illustrative diagram of an exemplary method using the exclusive field (in the case of 2 bits) in the PDCCH in the wireless communication system according to the first embodiment;

FIG. 6 is an illustrative diagram of an exemplary method using a common use field in the PDCCH in the wireless communication system according to the first embodiment;

FIG. 7 is an illustrative diagram of an exemplary method using the common use field in the PDCCH in the wireless communication system according to the first embodiment;

DESCRIPTION OF EMBODIMENTS

Preferred embodiments of the present invention will be explained with reference to accompanying drawings. A problem and embodiments in the present specification are by way of example and do not limit the scope of the right of the present application. In particular, the technology of the present application can even be applied to a different representation if it is technically equivalent even if the representation of the description is different, and the scope of the right is not limited. The embodiments can be combined with each other as appropriate to the extent that the processing details do not conflict with each other.

For the terms used and the technical details described in the present specification, terms and technical details described in specifications and contributions as communication-related standards such as 3rd Generation Partnership Project (3GPP) may be used as appropriate. Examples of such specifications include 3GPP TS36.211 V14.4.0, September 2017; 3GPP TS36.212 V14.4.0, September 2017; 3GPP TS36.213 V14.4.0, September 2017; 3GPP TS36.300 V14.4.0, September 2017; 3GPP TS36.321 V14.4.0, September 2017; 3GPP TS36.322 V14.1.0, September 2017; 3GPP TS36.323 V14.4.0, September 2017; 3GPP TS36.331 V14.4.0, September 2017; 3GPP TS36.413 V14.4.0, September 2017; 3GPP TS36.423 V14.4.0, September 2017; 3GPP TS36.425 V14.0.0, March 2017; 3GPP TS37.340 V2.0.0, December 2017; 3GPP TS38.201 V2.0.0, December 2017; 3GPP TS38.202 V2.0.0, December 2017; 3GPP TS38.211 V2.0.0, December 2017; 3GPP TS38.212 V1.2.1, December 2017; 3GPP TS38.213 V2.0.0, December 2017; 3GPP TS38.214 V2.0.0, December 2017; 3GPP TS38.215 V2.0.0, December 2017; 3GPP TS38.300 V2.0.0, December 2017; 3GPP TS38.321 V2.0.0, December 2017; 3GPP TS38.322 V2.0.0, December 2017; 3GPP TS38.323 V2.0.0, December 2017; 3GPP TS38.331 V0.4.0, December 2017; 3GPP TS38.401 V1.0.0, December 2017; 3GPP TS38.410 V0.6.0, December 2017; 3GPP TS38.413 V0.5.0, December 2017; 3GPP TS38.420 V0.5.0, December 2017; 3GPP TS38.423 V0.5.0, December 2017; 3GPP TS38.470 V1.0.0, December 2017; 3GPP TS38.473 V1.0.0, December 2017; 3GPP TR38.801 V14.0.0, April 2017; 3GPP TR38.802 V14.2.0, September 2017; 3GPP TR38.803 V14.2.0, September 2017; 3GPP TR38.804 V14.0.0, April 2017; 3GPP TR38.900 V14.3.1, July 2017; 3GPP TR38.912 V14.1.0, June 2017; and 3GPP TR38.913 V14.3.0, June 2017 described above.

The following describes embodiments of a wireless communication system, a base station, a terminal, and a method of communication disclosed by the present application in detail with reference to the accompanying drawings. The following embodiments do not limit the disclosed technology.

[a] First Embodiment

Configuration of Wireless Communication System

Figure 1:
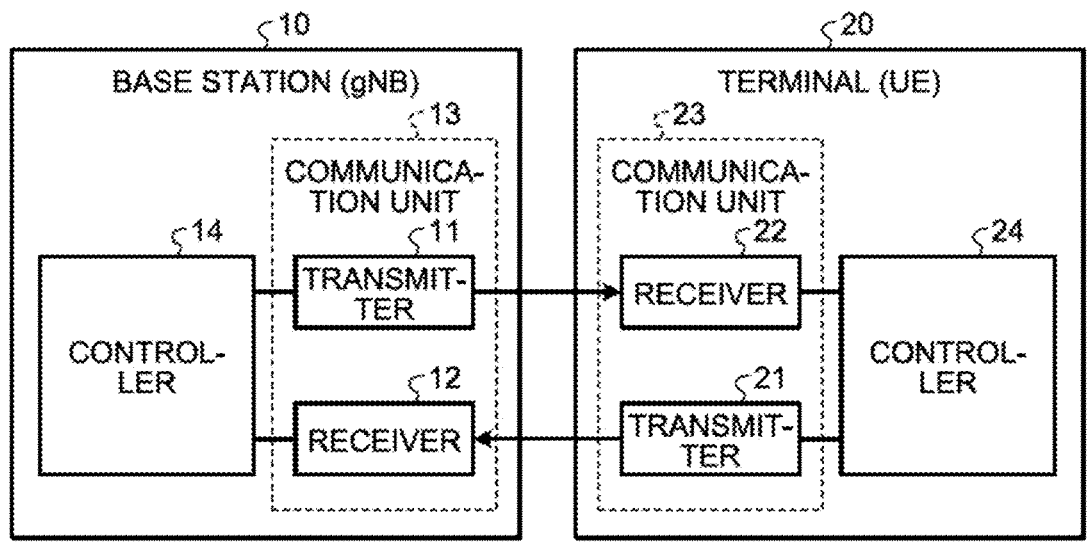
FIG. 1 is a schematic diagram of an exemplary configuration of a wireless communication system according to a first embodiment.

FIG. 1 is a schematic diagram of an exemplary configuration of a wireless communication system according to a first embodiment. The wireless communication system illustrated in FIG. 1 has a base station 10 and a terminal 20.

The terminal 20 is user equipment (UE) in Long Term Evolution (LTE), for example. The base station 10 is evolved Node B (eNB) in LTE, for example. In 3GPP, the 5th generation mobile communication (5G) is under study. In 5G, employment of New Radio Access Technology (RAT) is under study as a new communication technique. In New RAT, the base station 10 is called 5G NB (a 5G base station) or gNB. In the following, the terminal 20 is denoted as "the UE 20," whereas the base station 10 is denoted as "the gNB 10." New RAT is denoted as "NR" or "5G NR."

The gNB 10 has a communication unit 13 and a controller 14. The controller 14 comprehensively controls operation of the communication unit 13.

The communication unit 13 has a transmitter 11 and a receiver 12 to perform wireless communication with the UE 20. The transmitter 11 transmits data (downlink data) to the UE 20 by a physical downlink shared channel (PDSCH) and transmits downlink control information (DCI) to the UE 20 by a physical downlink control channel (PDCCH), for example. The receiver 12 receives data (uplink data) transmitted by a physical uplink shared channel (PUSCH) from the UE 20 and receives uplink control information (UCI) transmitted by a physical uplink control channel (PUCCH) from the UE 20, for example.

The UE 20 has a communication unit 23 and a controller 24. The controller 24 comprehensively controls operation of the communication unit 23.

The communication unit 23 has a transmitter 21 and a receiver 22 to perform wireless communication with the gNB 10. The transmitter 21 transmits the uplink data to the gNB 10 by the PUSCH and transmits the UCI to the gNB 10 by the PUCCH, for example. The receiver 22 receives the downlink data transmitted by the PDSCH from the gNB 10 and receives the DCI transmitted by the PDCCH from the gNB 10, for example.

Problem

The following describes a problem when the UE 20 transmits the uplink data and the UCI to the gNB 10 in 5G NR.

Figure 16:
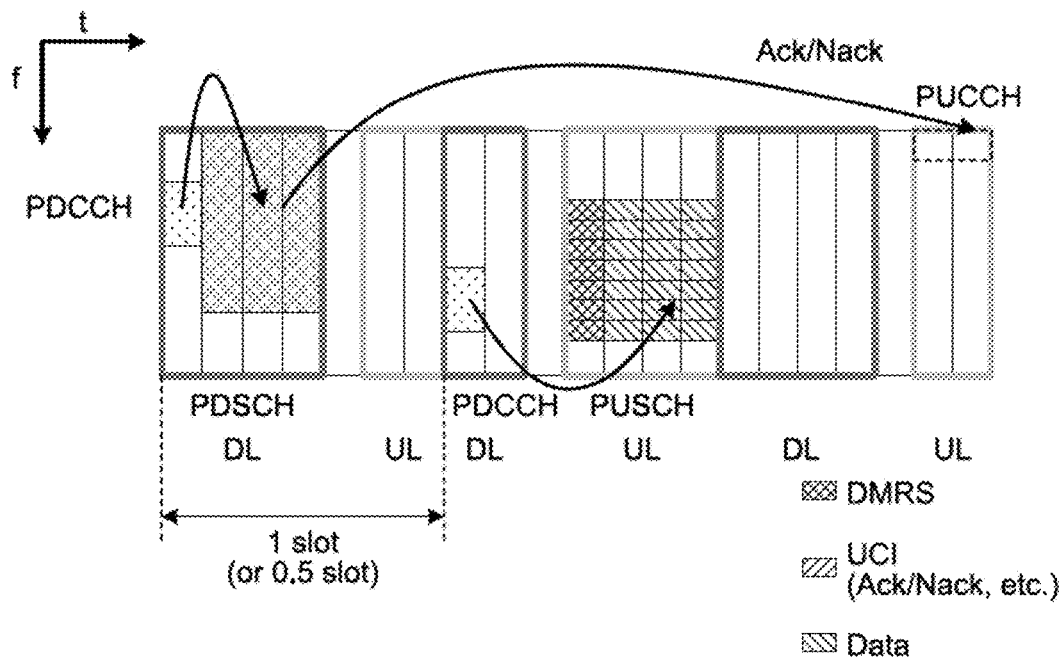
FIG. 16 is a schematic diagram of the 5th generation mobile communication New RAT (5G NR)

FIG. 16 is a schematic diagram of 5G NR. In FIG. 16, the horizontal axis represents time, whereas the vertical axis represents frequency. In 5G NR, slot is defined as a transmission unit in a time direction. Specifically, slot-based transmission (a long section) and non-slot-based transmission (a short section) are defined. The long section is defined to be 1 slot, whereas the short section is defined to be 0.5 slot, for example. For Ultra-Reliable and Low Latency Communications (URLLC), use of the short section is assumed in order to achieve low latency, whereas for enhanced Mobile Broadband (eMBB), use of both the long section and the short section is assumed, for example. The UE 20 transmits data ("Data" in FIG. 16) and a demodulation reference signal (DMRS) to the gNB 10 by the PUSCH. The UE 20 transmits the UCI including Ack/Nack to the gNB 10 by the PUCCH. In the following, when the UCI is illustrated, it may be denoted as "UCI," "Ack/Nack, or "UCI (Ack/Nack, etc.)."

Figure 17:
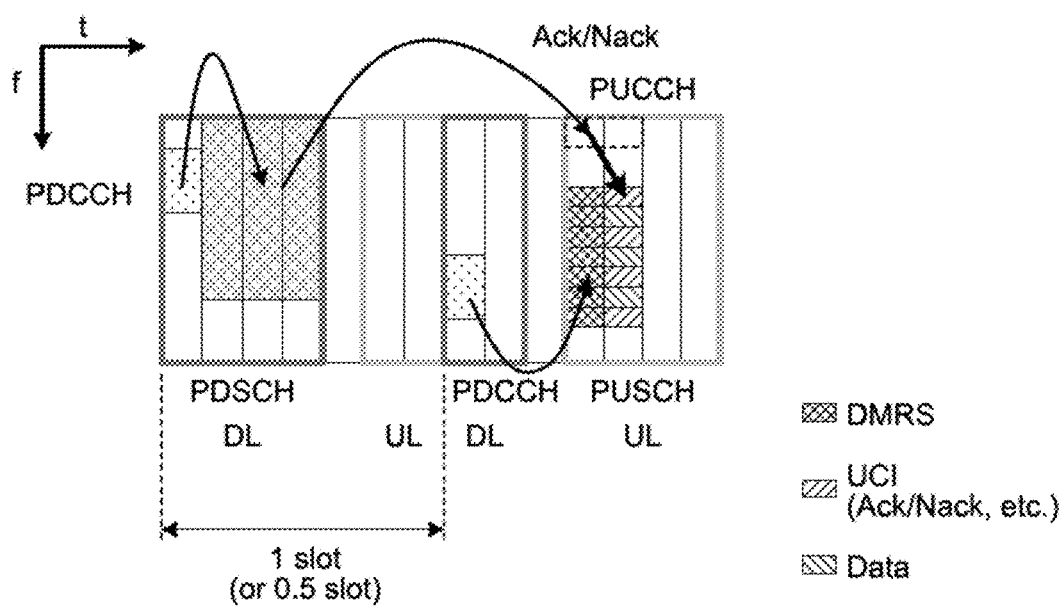
FIG. 17 is an illustrative diagram of a problem of 5G NR.

FIG. 17 is an illustrative diagram of the problem of 5G NR. In FIG. 17, the horizontal axis represents time, whereas the vertical axis represents frequency. In the 5G communication standard, discussions are developing in line with employment of transmission of the UCI piggybacked on the PUSCH by the UE 20 when a transmission timing of the UCI and a transmission timing of the data overlap with each other, for example. However, like the 4th generation mobile communication (4G) wireless communication system, when the UE 20 transmits the UCI piggybacked on the PUSCH when the transmission timing of the UCI and the transmission timing of the data overlap with each other, the proportion of the uplink data in the PUSCH is small as illustrated in FIG. 17. Thus, the redundancy of the PUSCH is insufficient to worsen an error rate. When data for URLLC, which demands high reliability, is transmitted in the 5G wireless communication system, for example, there is a possibility that a demanded error rate won't be able to be fulfilled.

Solution

Given these circumstances, in the wireless communication system according to the first embodiment, the gNB 10 instructs the UE 20 by which resource to transmit the UCI when the timing of transmitting the data by the PUSCH and the timing of transmitting the UCI by the PUCCH overlap with each other. The following describes this point with reference to a specific example.

Figure 2:
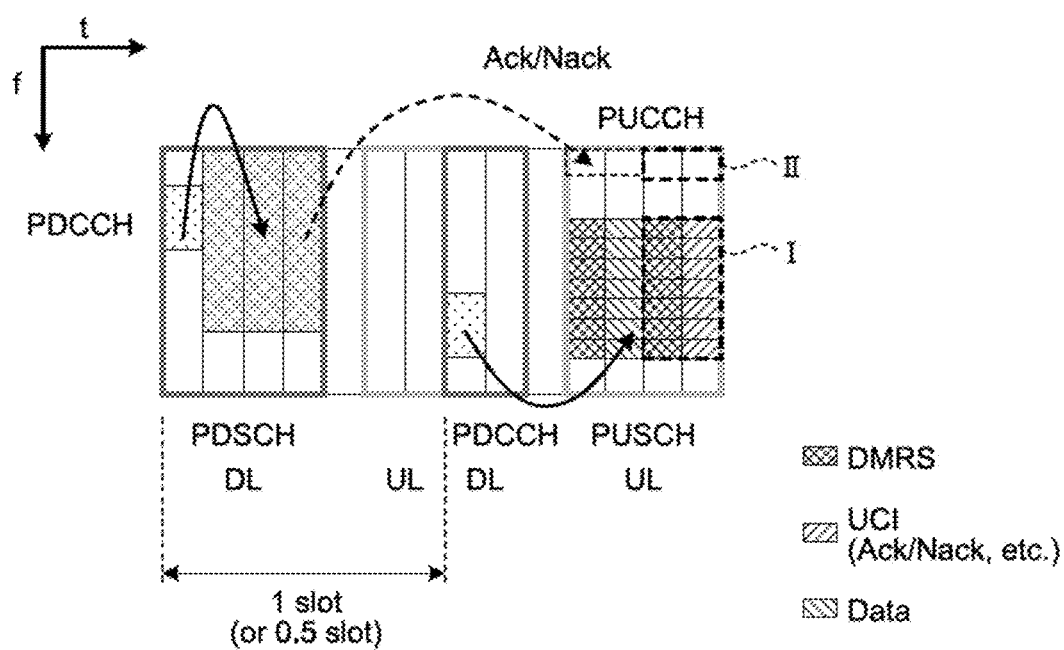
FIG. 2 is an illustrative diagram of an outline of the wireless communication system according to the first embodiment.
Figure 3:
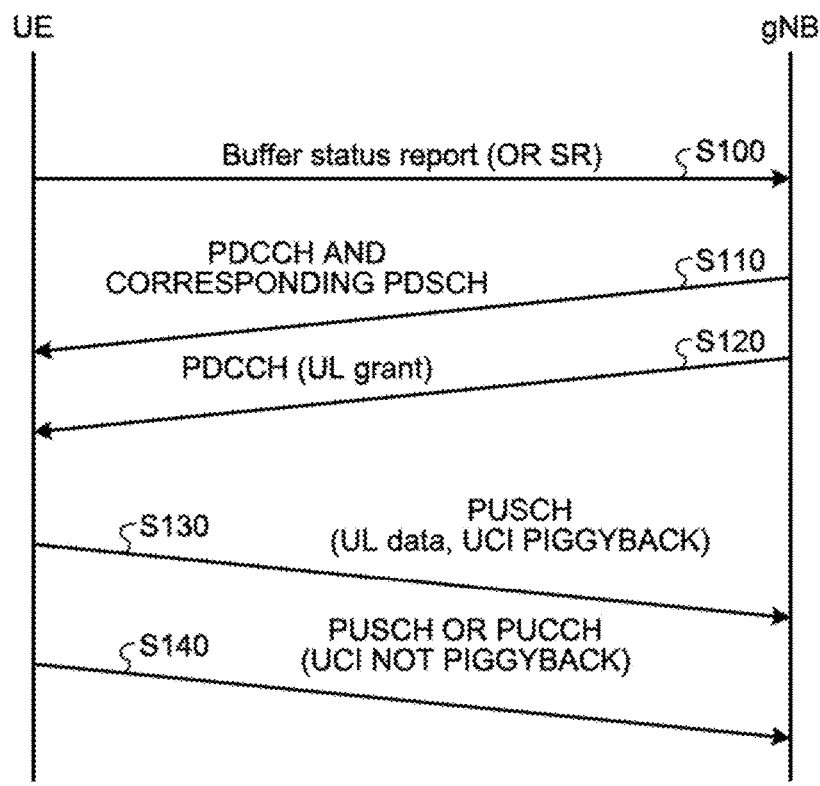
FIG. 3 is a sequential diagram of operation of the wireless communication system according to the first embodiment.

FIG. 2 is an illustrative diagram of an outline of the wireless communication system according to the first embodiment. in FIG. 2, the horizontal axis represents time, whereas the vertical axis represents frequency. FIG. 3 is a sequential diagram of operation of the wireless communication system according to the first embodiment.

In a logical channel (hereinafter, may also be denoted as "the LCH"), data to be transmitted occurs, for example. In this case, the transmitter 21 of the UE 20 transmits a first signal including information on the type of the data to be transmitted to the gNB 10 by Buffer status report or scheduling request (SR) (Step S100 in FIG. 3). That is to say, the UE 20 informs the type of the data desired to be transmitted to the gNB 10. The receiver 12 of the gNB 10 receives the first signal.

Next, the transmitter 11 of the gNB 10 transmits the DCI and the data to the UE 20 by the PDCCH and the corresponding PDSCH, respectively (Step S110 in FIG. 3). That is to say, the gNB 10 transmits the downlink data to the UE 20 by the PDSCH and transmits the DCI to the UE 20 by the PDCCH. The DCI includes information on UL grant (PUSCH assignment information) and DL assignment (PDSCH assignment information), for example.

Next, the transmitter 11 of the gNB 10 transmits a second signal including information indicating whether the UCI is able to be transmitted by a channel assigned to transmission of the data by the PDCCH related to UL grant in accordance with the type of the data informed from the UE 20 (Step S120 in FIG. 3). The receiver 22 of the UE 20 receives the second signal. When the type of the data informed from the UE 20 is a first type (eMBB, for example), the second signal includes information indicating that the UCI is transmitted by a resource of a channel (the PUSCH) assigned to transmission of the data of the first type. When the type of the data informed from the UE 20 is a second type (URLLC, for example), the second signal includes information indicating that the UCI is transmitted by a resource other than a channel assigned to transmission of the data of the second type.

Next, in the UE 20, the transmission timing of the UCI and the transmission timing of the data overlap with each other. The type of the data is the first type (eMBB, for example). In this case, the transmitter 21 of the UE 20 transmits the data of the first type ("UL data" in FIG. 3) by the PUSCH (Step S130 in FIG. 3). The transmitter 21 of the UE 20 transmits the UCI to the gNB 10 in accordance with the information included in the second signal. Specifically, the UE 20 transmits the UCI carried on the PUSCH assigned to transmission of the data of the first type to the gNB 10. That is to say, the UE 20 transmits the UCI piggybacked on the PUSCH and does not execute Step S140.

On the other hand, in the UE 20, when the transmission timing of the UCI and the transmission timing of the data overlap with each other, the type of the data is the second type (URLLC, for example). In this case, the transmitter 21 of the UE 20 transmits the data of the second type ("UL data" in FIG. 3) by the PUSCH (Step S130 in FIG. 3). The transmitter 21 of the UE 20 transmits the UCI to the gNB 10 in accordance with the information included in the second signal without the UCI piggybacked on the PUSCH at Step S130 (Step S140 in FIG. 3). Specifically, at Step S140, the UE 20 transmits the UCI to the gNB 10 by a resource other than the PUSCH. The UE 20 transmits the UCI to the gNB 10 by the PUSCH after the PUSCH assigned to transmission of the data of the second type (refer to "I" in FIG. 2), for example. The UE 20 transmits the UCI to the gNB 10 by the PUCCH after the PUSCH assigned to transmission of the data of the second type (refer to "II" in FIG. 2).

At Step S120, the transmitter 11 of the gNB 10 transmits the second signal including information on a resource transmitting the UCI to the UE 20 by a specific field in the PDCCH. That is to say, the transmitter 11 of the gNB 10 instructs the UE 20 whether the UCI is piggybacked on the PUSCH. Examples of this method of instruction include a method using an exclusive field set as the specific field in the PDCCH and a method using an existing field as a common use field as the specific field in the PDCCH.

First, the following describes the method using an exclusive field set as the specific field in the PDCCH.

FIG. 4 is an illustrative diagram of an exemplary method using an exclusive field (in the case of 1 bit) in the PDCCH in the wireless communication system according to the first embodiment.

As illustrated in FIG. 4, the exclusive field in the PDCCH is set to 1 bit, and the gNB 10 performs an instruction by a value of the exclusive field in the PDCCH of "0" and "1." The gNB 10 maps the values "0" and "1" of the exclusive field in the PDCCH on the LCH in advance to associate the LCH and the PDCCH with each other. The gNB 10 sets a resource transmitting the UCI to be used when the value of the exclusive field in the PDCCH is "0" or "1" by radio resource control (RRC) in advance and informs the resource to the UE 20.

At Step S120, the gNB 10 performs an instruction by the PDCCH in accordance with the type of the data informed from the UE 20, for example. In this process, the gNB 10 performs an instruction with a value of the exclusive field in the PDCCH of "0." Then, in the UE 20, the transmission timing of the UCI and the transmission timing of the data (the data of eMBB, for example) overlap with each other. In this process, at Step S130, the UE 20 transmits the data and the UCI by the PUSCH. That is to say, the UE 20 transmits the UCI piggybacked on the PUSCH and does not execute Step S140.

At Step S120, the gNB 10 performs an instruction by the PDCCH in accordance with the type of the data informed from the UE 20, for example. In this process, the gNB 10 performs an instruction with a value of the exclusive field in the PDCCH of "1." Then, in the UE 20, the transmission timing of the UCI and the transmission timing of the data (the data of URLLC, for example) overlap with each other. In this process, at Step S130, the UE 20 transmits the data by the PUSCH. At Step S130, the UE 20 does not piggyback the UCI on the PUSCH. In this case, at Step S140, the UE 20 transmits the UCI to the gNB 10 by a resource (the PUSCH or the PUCCH) other than the channel (the PUSCH) assigned to transmission of the data.

Thus, the gNB 10 can recognize which data is to be transmitted from the UE 20 by the information from the UE 20 and recognize by which channel the UCI is to be transmitted from the UE 20 by the instruction to the UE 20.

FIG. 5 is an illustrative diagram of an exemplary method using the exclusive field (in the case of 2 bits) in the PDCCH in the wireless communication system according to the first embodiment.

As illustrated in FIG. 5, the exclusive field in the PDCCH is set to 2 bits, and the gNB 10 instructs the value of the exclusive field in the PDCCH by "00," "01," "10," and "11." The gNB 10 maps the values "00," "01," "10," and "11" of the exclusive field in the PDCCH on the LCH in advance to associate the LCH and the PDCCH with each other. The gNB 10 sets a resource transmitting the UCI to be used when the value of the exclusive field in the PDCCH is "00," "01," "10," or "11" by RRC in advance and informs the resource to the UE 20.

At Step S120, the gNB 10 performs an instruction by the PDCCH in accordance with the type of the data informed from the UE 20, for example. In this process, the gNB 10 performs an instruction with a value of the exclusive field in the PDCCH of "00." Then, in the UE 20, the transmission timing of the UCI and the transmission timing of the data (the data of eMBB, for example) overlap with each other. In this process, at Step S130, the UE 20 transmits the data ("UL data" relative to "00" in FIG. 5) and the UCI by the PUSCH. That is to say, the UE 20 transmits the UCI piggybacked on the PUSCH and does not execute Step S140.

At Step S120, the gNB 10 performs an instruction by the PDCCH in accordance with the type of the data informed from the UE 20, for example. In this process, the gNB 10 performs an instruction with a value of the exclusive field in the PDCCH of "01." Then, in the UE 20, the transmission timing of the UCI and the transmission timing of the data (the data of URLLC, for example) overlap with each other. In this process, at Step S130, the UE 20 transmits the data by the PUSCH. In this case, at Step S130, the UE 20 does not piggyback the UCI on the PUSCH and does not execute Step S140, either. This processing is used in an option in which the UCI is not transmitted this time depending on a situation, for example.

At Step S120, the gNB 10 performs an instruction by the PDCCH in accordance with the type of the data informed from the UE 20, for example. In this process, the gNB 10 performs an instruction with a value of the exclusive field in the PDCCH of "10." Then, in the UE 20, the transmission timing of the UCI and the transmission timing of the data (the data of URLLC, for example) overlap with each other. In this process, at Step S130, the UE 20 transmits the data by the PUSCH. In this case, at Step S130, the UE 20 does not piggyback the UCI on the PUSCH. In this case, at Step S140, the UE 20 transmits the UCI to the gNB 10 by the PUSCH (refer to "I" in FIG. 2) after the PUSCH assigned to transmission of the data ("UL data" relative to "10" in FIG. 5), for example.

At Step S120, the gNB 10 performs an instruction by the PDCCH in accordance with the type of the data informed from the UE 20, for example. In this process, the gNB 10 performs an instruction with a value of the exclusive field in the PDCCH of "11." Then, in the UE 20, the transmission timing of the UCI and the transmission timing of the data (the data of URLLC, for example) overlap with each other. In this process, at Step S130, the UE 20 transmits the data by the PUSCH. In this case, at Step S130, the UE 20 does not piggyback the UCI on the PUSCH. In this case, at Step S140, the UE 20 transmits the UCI to the gNB 10 by the PUCCH (refer to "II" in FIG. 2) after the PUSCH assigned to transmission of the data ("UL data" relative to "11" in FIG. 5), for example.

Thus, the gNB 10 can recognize which data is to be transmitted from the UE 20 by the information from the UE 20 and recognize by which channel the UCI is to be transmitted from the UE 20 by the instruction to the UE 20. Although FIG. 5 provides an example in which "10" designates the PUSCH resource, whereas "11" designates the PUCCH resource, "10" and "11" may designate different PUCCH resources (or different PUSCH resources).

Although the wireless communication system according to the first embodiment describes a case of one bit and a case of 2 bits as the method using the exclusive field in the PDCCH as an example, this is not limiting; the resource transmitting the UCI may be set using a plurality of bits. The resource transmitting the UCI may be set by following the method described above for the top 1 bit or 2 bits and considering specific contents (time, frequency, and the like) by the next n bits, for example.

The following describes a method using an existing field defining the value of another parameter as a common use field as the specific field in the PDCCH.

In this case, in a field about the size of a resource mapping the UCI (or a field about a mapping UCI bit number), an instruction with the size of the mapping resource being "0" (or the mapping UCI bit number being "0") is performed. Then, $\beta_{offset}^{HARQ-ACK}$ is used as a parameter determining the size of a resource mapping ACK/NACK. $\beta_{offset}^{CSI}$ is used as a parameter determining the size of a resource mapping the CSI. The following describes $\beta_{offset}^{HARQ-ACK}$ as an example. $\beta_{offset}^{HARQ-ACK}$ is a parameter determining, when ACK/NACK is carried on the PUSCH, transmission is performed using what a RE (resource element) number. The RE number is calculated by Expression (1) below.

$$Q' = \left\lceil \frac{(O+L) \cdot M_{sc}^{PUSCH} \cdot N_{symb}^{PUSCH} \cdot \beta_{offset}^{HARQ-ACK}}{\sum_{r=0}^{C-1} K_r} \right\rceil \quad (1)$$

In Expression (1), Q' is the RE number and represents a number when ACK/NACK included in the UCI is mapped. In the numerator of Expression (1), O represents the bit number of ACK/NACK, whereas L represents the bit number of a circulating redundancy check (CRC) code to be added to ACK/NACK. In the numerator of Expression (1), $M_{SC}^{PUSCH}$ represents the number of subcarriers to be transmitted by the PUSCH, whereas $N_{symb}^{PUSCH}$ represents the number of symbols to be transmitted by the PUSCH. In the denominator of Expression (1), C and Kr represent parameters obtained from the PDCCH scheduling PUSCH transmission. However, when Q' is larger than a certain RE number set in advance, the mapping of ACK/NACK is performed only for the certain RE number.

FIG. 6 and FIG. 7 are illustrative diagrams of exemplary methods using a β offset field in the PDCCH in the wireless communication system according to the first embodiment. FIG. 6 and FIG. 7 are described in "Table 9.3-1" and "Table 9.3-3," respectively, of Section 9.3 of 3GPP TS38.213 V2.0.0.

"Table 9.3-1" illustrated in FIG. 6 illustrates the value and number of a β offset in the case of ACK/NACK and associates 32 numbers "0" to "31" and $\beta_{offset}^{HARQ-ACK}$ with each other. For $\beta_{offset}^{HARQ-ACK}$ corresponding to the numbers "0" to "15," values of "1.000" or more are set. For $\beta_{offset}^{HARQ-ACK}$ corresponding to the numbers "16" to "31," "Reserved" is set.

"Table 9.3-3" illustrated in FIG. 7 associates four values "00," "01," "10," and "11" as an UCI offset indicator and four selected numbers among the 32 numbers "0" to "31" in "Table 9.3-1" illustrated in FIG. 6 with each other.

Also for the method using the existing field, the values "00," "01," "10," and "11" of the UCI offset indicator illustrated in FIG. 7 are set to the same contents as the values "00," "01," "10," and "11" of the exclusive field illustrated in FIG. 5, respectively, for example. In this case, the gNB 10 associates the values "00," "10," and "11" illustrated in FIG. 7 and three selected numbers among the numbers "0" to "15" illustrated in FIG. 6 with each other. The gNB 10 associates the value "01" illustrated in FIG. 7 and one number among the numbers "16" to "31" illustrated in FIG. 6 with each other. "0" is set to $\beta_{offset}^{HARQ-ACK}$ corresponding to the numbers "16" to "31" illustrated in FIG. 6, whereby the numerator of Expression (1) is "0." That is to say, the RE number is "0," and thus the UCI including ACK/NACK is not transmitted.

Specifically, as illustrated in FIG. 7, the gNB 10 instructs the value of the common use field in the PDCCH by "00," "01," "10," and "11" (in FIG. 6, the four selected numbers). The gNB 10 maps the values "00," "01," "10," and "11" of the common use field in the PDCCH on the LCH in advance to associate the LCH and the PDCCH with each other. The gNB 10 sets a resource transmitting the UCI to be used when the value of the common use field in the PDCCH is "00," "01," "10," or "11" by RRC in advance and informs the resource to the UE 20.

At Step S120, the gNB 10 performs an instruction by the PDCCH in accordance with the type of the data informed from the UE 20, for example. In this process, the gNB 10 instructs the value of the common use field in the PDCCH to be the value "00" illustrated in FIG. 7 (one number among the numbers "0" to "15" illustrated in FIG. 6). Then, in the UE 20, the transmission timing of the UCI and the transmission timing of the data (the data of eMBB, for example) overlap with each other. In this process, at Step S130, the UE 20 transmits the data and the UCI by the PUSCH. That is to say, the UE 20 transmits the UCI piggybacked on the PUSCH and does not execute Step S140.

At Step S120, the gNB 10 performs an instruction by the PDCCH in accordance with the type of the data informed from the UE 20, for example. In this process, the gNB 10 instructs the value of the common use field in the PDCCH to be the value "01" illustrated in FIG. 7 (one number among the numbers "16" to "31" illustrated in FIG. 6). Then, in the UE 20, the transmission timing of the UCI and the transmission timing of the data (the data of URLLC, for example) overlap with each other. In this process, at Step S130, the UE 20 transmits the data by the PUSCH. In this case, at Step S130, the UE 20 does not piggyback the UCI on the PUSCH and does not execute Step S140, either. This processing is used in an option in which the UCI is not transmitted this time depending on a situation, for example.

At Step S120, the gNB 10 performs an instruction by the PDCCH in accordance with the type of the data informed from the UE 20, for example. In this process, the gNB 10 instructs the value of the common use field in the PDCCH to be the value "10" illustrated in FIG. 7 (another number among the numbers "0" to "15" illustrated in FIG. 6). Then, in the UE 20, the transmission timing of the UCI and the transmission timing of the data (the data of URLLC, for example) overlap with each other. In this process, at Step S130, the UE 20 transmits the data by the PUSCH. In this case, at Step S130, the UE 20 does not piggyback the UCI on the PUSCH. In this case, at Step S140, the UE 20 transmits the UCI to the gNB 10 by the PUCCH (refer to "I" in FIG. 2) after the PUSCH assigned to transmission of the data, for example.

At Step S120, the gNB 10 performs an instruction by the PDCCH in accordance with the type of the data informed from the UE 20, for example. In this process, the gNB 10 instructs the value of the common use field in the PDCCH to be the value "11" illustrated in FIG. 7 (still another number among the numbers "0" to "15" illustrated in FIG. 6). Then, in the UE 20, the transmission timing of the UCI and the transmission timing of the data (the data of URLLC, for example) overlap with each other. In this process, at Step S130, the UE 20 transmits the data by the PUSCH. In this case, at Step S130, the UE 20 does not piggyback the UCI on the PUSCH. In this case, at Step S140, the UE 20 transmits the UCI to the gNB 10 by the PUCCH (refer to "II" in FIG. 2) after the PUSCH assigned to transmission of the data, for example.

Thus, the gNB 10 can recognize which data is to be transmitted from the UE 20 by the information from the UE 20 and recognize by which channel the UCI is to be transmitted from the UE 20 by the instruction to the UE 20. Although FIG. 7 provides an example in which "10" designates the PUSCH resource, whereas "11" designates the PUCCH resource, "10" and "11" may designate different PUCCH resources (or different PUSCH resources). Although the β offset field is provided as an example using the common use field in the PDCCH, this is not limiting. Using a field indicating a mapping ACK/NACK bit number (that is to say, "O" in Expression (1)), the ACK/NACK bit number may be able to be instructed to be "0," for example. In this case, a CRC bit number to be added is also "0."

According to the foregoing description, the wireless communication system according to the first embodiment includes the terminal (the UE 20) and the base station (the gNB 10). When the timing of transmitting the data and the timing of transmitting the control information (the UCI) overlap with each other, the UE 20 transmits the UCI simultaneously with the data to the gNB 10 using the channel assigned to transmission of the data. In this wireless communication system, the transmitter 21 of the UE 20 transmits the first signal including the information on the type of the data to be transmitted, whereas the receiver 12 of the gNB 10 receives the first signal. The transmitter 11 of the gNB 10 transmits the second signal including the information indicating whether the UCI is able to be transmitted by the channel assigned to transmission of the data to the UE 20 in accordance with the type of the data informed from the UE 20. When the type of the data is the first type (eMBB), the second signal includes the information indicating transmission of the UCI by the resource of the channel (the PUSCH) assigned to transmission of the data. When the type of the data is the second type (URLLC), the second signal includes the information indicating transmission of the UCI by the resource (the PUSCH or the PUCCH) other than the channel (the PUSCH) assigned to transmission of the data. The transmitter 11 of the gNB 10 transmits the second signal including the information on the resource transmitting the UCI by the specific field (the exclusive field or the common use field) in the downlink channel (the PDCCH) to the UE 20. The receiver 22 of the UE 20 receives the second signal. When the timing of transmitting the data and the timing of transmitting the UCI overlap with each other, the transmitter 21 of the UE 20 transmits the UCI to the gNB 10 in accordance with the information included in the second signal.

As described above, in the wireless communication system according to the first embodiment, when the transmission timings of the data of the second type (URLLC) and the UCI overlap with each other, the gNB 10 instructs the UE 20 to delay the transmission timing of the UCI. The gNB 10 indicates, as the resource other than the channel (the PUSCH) assigned to transmission of the data of the second type (URLLC), the PUSCH (refer to "I" in FIG. 1) or the PUCCH (refer to "II" in FIG. 2) after the channel (the PUSCH), for example. Consequently, the proportion of the uplink data in the PUSCH is ensured. That is to say, the redundancy of the PUSCH is not insufficient. Thus, the wireless communication system according to the first embodiment, when the data for URLLC, which demands high reliability, is transmitted, can ensure a resource to be assigned to the data for URLLC and fulfill a demanded error rate.

[b] Second Embodiment

Although in the wireless communication system according to the first embodiment the gNB 10 transmits the second signal including the information on the resource transmitting the UCI by the specific field (the exclusive field or the common use field) in the PDCCH to the UE 20, this is not limiting. In a wireless communication system according to a second embodiment, the gNB 10 transmits the second signal including information identifying a time-to-frequency area to which the PDCCH related to the resource transmitting the UCI is assigned to the UE 20, for example. In the second embodiment, the same parts as those of the first embodiment are denoted by the same symbols, and descriptions thereof are omitted.

Figure 8:
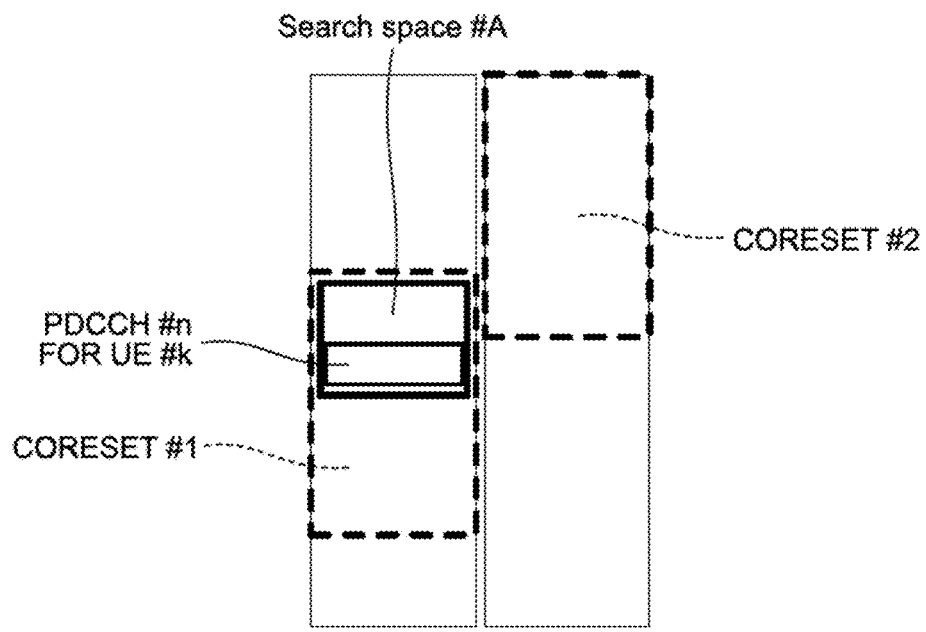
FIG. 8 is an illustrative diagram of an outline of a wireless communication system according to a second embodiment.

FIG. 8 is an illustrative diagram of an outline of the wireless communication system according to the second embodiment.

Examples of the information identifying the time-to-frequency area to which the PDCCH is assigned include size, radio network temporary identity (RNTI), header, the place of control resource set (CORESET), and Search space. The gNB 10 maps the information identifying the time-to-frequency area to which the PDCCH is assigned on the LCH in advance to associate the LCH and the PDCCH with each other. The gNB 10 sets a resource transmitting the UCI to be used by the information by the RRC in advance and informs the resource to the UE 20.

As illustrated in FIG. 8, the PDCCH is distinguished by the place of CORESET and Search space, for example. The place of CORESET is distinguished as CORESET for the data of URLLC "CORESET #1" or CORESET for the data of eMBB "CORESET #2," for example. "CORESET #1" includes "Search space #A" as Search space. In "Search space #A," the PDCCH "PDCCH #n" indicating the resource (the PUSCH or the PUCCH after the PUSCH assigned to transmission of the data of URLLC) other than the channel assigned to transmission of the data of URLLC is set.

At Step S120, the gNB 10 performs an instruction by the PDCCH in accordance with the type of the data informed from the UE 20, for example. In this process, the gNB 10 performs an instruction of the place of CORESET with "CORESET #2" as the information identifying the time-to-frequency area to which the PDCCH is assigned. Then, in the UE 20, the transmission timing of the UCI and the transmission timing of the data (the data of eMBB, for example) overlap with each other. In this process, at Step S130, the UE 20 transmits the data and the UCI by the PUSCH. That is to say, the UE 20 transmits the UCI piggybacked on the PUSCH and does not execute Step S140.

At Step S120, the gNB 10 performs an instruction by the PDCCH in accordance with the type of the data informed from the UE 20, for example. In this process, the gNB 10 performs an instruction of the place of CORESET with "CORESET #1" as the information identifying the time-to-frequency area to which the PDCCH is assigned. Then, in the UE 20, the transmission timing of the UCI and the transmission timing of the data (the data of URLLC, for example) overlap with each other. In this process, at Step S130, the UE 20 transmits the data by the PUSCH. At Step S130, the UE 20 does not piggyback the UCI on the PUSCH. In this case, at Step S140, the UE 20 transmits the UCI to the gNB 10 by the resource (the PUSCH or the PUCCH) other than the channel (the PUSCH) assigned to transmission of the data.

Thus, the gNB 10 can recognize which data is to be transmitted from the UE 20 by the information from the UE 20 and recognize by which channel the UCI is to be transmitted from the UE 20 by the instruction to the UE 20.

According to the foregoing description, the wireless communication system according to the second embodiment includes the terminal (the UE 20) and the base station (the gNB 10). When the timing of transmitting the data and the timing of transmitting the control information (the UCI) overlap with each other, the UE 20 transmits the UCI simultaneously with the data to the gNB 10 using the channel assigned to transmission of the data. In this wireless communication system, the transmitter 21 of the UE 20 transmits the first signal including the information on the type of the data to be transmitted, whereas the receiver 12 of the gNB 10 receives the first signal. The transmitter 11 of the gNB 10 transmits the second signal including the information indicating whether the UCI is able to be transmitted by the channel assigned to transmission of the data to the UE 20 in accordance with the type of the data informed from the UE 20. When the type of the data is the first type (eMBB), the second signal includes the information indicating transmission of the UCI by the resource of the channel (the PUSCH) assigned to transmission of the data. When the type of the data is the second type (URLLC), the second signal includes the information indicating transmission of the UCI by the resource (the PUSCH or the PUCCH) other than the channel (the PUSCH) assigned to transmission of the data. The transmitter 11 of the gNB 10 transmits the second signal including the information (size, RNTI, header, the place of CORESET, and Search space) identifying the area to which the downlink channel (the PDCCH) related to the resource transmitting the UCI by the UE 20 is assigned to the UE 20. The receiver 22 of the UE 20 receives the second signal. When the timing of transmitting the data and the timing of transmitting the UCI overlap with each other, the transmitter 21 of the UE 20 transmits the UCI to the gNB 10 in accordance with the information included in the second signal.

Thus, in the wireless communication system according to the second embodiment, when the transmission timings of the data of the second type (URLLC) and the UCI overlap with each other, the gNB 10 instructs the UE 20 to delay the transmission timing of the UCI. The gNB 10 indicates, as the resource other than the channel (the PUSCH) assigned to transmission of the data of the second type (URLLC), the PUSCH (refer to "I" in FIG. 2) or the PUCCH (refer to "II" in FIG. 2) after the channel (the PUSCH), for example. Consequently, the proportion of the uplink data in the PUSCH is ensured. That is to say, the redundancy of the PUSCH is not insufficient. Thus, the wireless communication system according to the second embodiment, when the data for URLLC, which demands high reliability, is transmitted, can ensure a resource to be assigned to the data for URLLC and fulfill a demanded error rate.

[c] Third Embodiment

As described above, in the wireless communication systems according to the first embodiment and the second embodiment, when the type of the data is the second type (URLLC), the gNB 10 transmits the second signal including the information indicating transmission of the UCI by the resource (the PUSCH or the PUCCH) other than the PUSCH assigned to transmission of the data to the UE 20. In this case, the gNB 10 uses the PDCCH indicating the PUSCH assigned to transmission of the data of the second type. However, this is not limiting. In a wireless communication system according to a third embodiment, the gNB 10 uses a resource other than the PDCCH indicating the PUSCH assigned to transmission of the data of the second type, for example. In the third embodiment, the same parts as those of the first embodiment and the second embodiment are denoted by the same symbols, and descriptions thereof are omitted.

Figure 9:
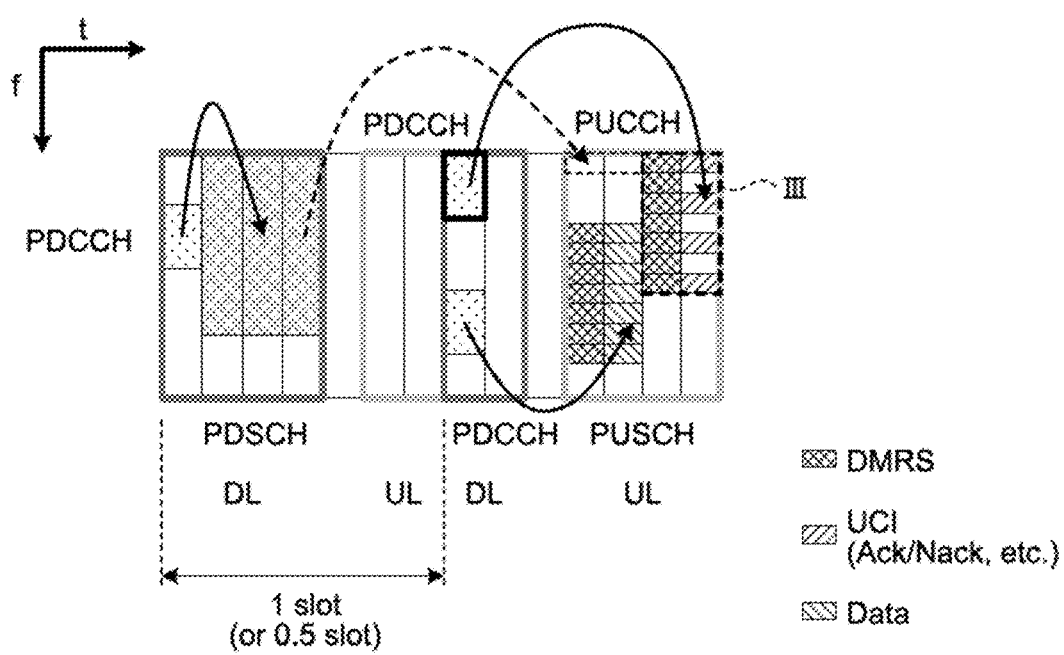
FIG. 9 is an illustrative diagram of an outline of a wireless communication system according to a third embodiment.

FIG. 9 is an illustrative diagram of an outline of the wireless communication system according to the third embodiment. In FIG. 9, the horizontal axis represents time, whereas the vertical axis represents frequency. The type of the data informed from the UE 20 is the second type (URLLC, for example), for example. In this case, the gNB 10, using the resource other than the PDCCH indicating the PUSCH assigned to transmission of the data of the second type, indicates a resource (the PUSCH or the PUCCH) other than the PUSCH assigned to transmission of the data to the UE 20. The gNB 10 uses the PDCCH different from the PDCCH indicating the PUSCH assigned to transmission of the data of the second type, for example. In this case, the UE 20 transmits the UCI to the gNB 10 by the PUSCH after the PUSCH assigned to transmission of the data of the second type (refer to "III" in FIG. 9).

Figure 10:
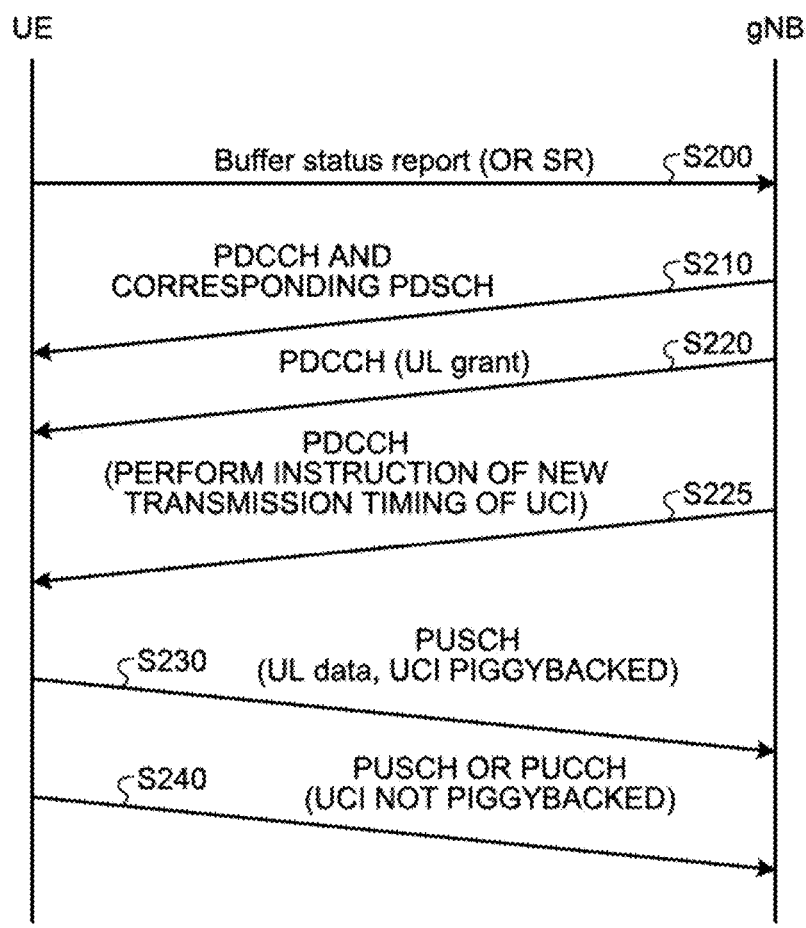
FIG. 10 is a sequential diagram of operation of the wireless communication system according to the third embodiment.

FIG. 10 is a sequential diagram of operation of the wireless communication system according to the third embodiment.

In the LCH, data to be transmitted occurs, for example. In this case, the transmitter 21 of the UE 20 transmits the first signal including information on the type of the data to be transmitted by Buffer status report or SR to the gNB 10 (Step S200 in FIG. 10). That is to say, the UE 20 informs the type of the data desired to be transmitted to the gNB 10. The receiver 12 of the gNB 10 receives the first signal.

Next, the transmitter 11 of the gNB 10 transmits the DCI and the data to the UE 20 by the PDCCH and the corresponding PDSCH, respectively (Step S210 in FIG. 3). That is to say, the gNB 10 transmits the downlink data to the UE 20 by the PDSCH and transmits the DCI to the UE 20 by the PDCCH. The DCI includes information on UL grant (PUSCH assignment information) and DL assignment (PDSCH assignment information), for example.

Next, the transmitter 11 of the gNB 10 transmits the second signal including the information indicating whether the UCI is able to be transmitted by the channel assigned to transmission of the data by the PDCCH related to UL grant in accordance with the type of the data informed from the UE 20 (Step S220 in FIG. 10). The receiver 22 of the UE 20 receives the second signal. When the type of the data informed from the UE 20 is the second type (URLLC, for example), the transmitter 11 of the gNB 10 performs an instruction that the UCI is not piggybacked on the PUSCH by the PDCCH. Examples of a method that performs an instruction that the UCI is not piggybacked on the PUSCH by the PDCCH include first and second methods below. The first method is a method using the specific field (the exclusive field or the common use field) in the PDCCH in the first embodiment. The second method is a method using the information (size, RNTI, header, the place of CORESET, and Search space) identifying the time-to-frequency area to which the PDCCH is assigned in the second embodiment.

The transmitter 11 of the gNB 10 performs an instruction of a new transmission timing (resource) of the UCI by another PDCCH (Step S225 in FIG. 10). The gNB 10 transmits a third signal including information on a resource other than the channel (the PUSCH) assigned to transmission of the data of the second type to the UE 20 using the PDCCH different from the PDCCH indicating the PUSCH assigned to transmission of the data of the second type, for example. The receiver 22 of the UE 20 receives the third signal.

In the UE 20, when the transmission timing of the UCI and the transmission timing of the data overlap with each other, the type of the data is the second type (URLLC, for example). In this case, the transmitter 21 of the UE 20 transmits the data of the second type ("UL data" in FIG. 10) by the PUSCH (Step S230 in FIG. 10). The transmitter 21 of the UE 20 transmits the UCI to the gNB 10 in accordance with the pieces of information included in the second and third signals without the UCI piggybacked on the PUSCH at Step S230 (Step S240 in FIG. 10). Specifically, at Step S240, the UE 20 transmits the UCI to the gNB 10 by a resource other than the PUSCH assigned to transmission of the data of the second type. The UE 20 transmits the UCI to the gNB 10 by the PUSCH after the PUSCH assigned to transmission of the data of the second type (refer to "III" in FIG. 9), for example. The UE 20 transmits the UCI to the gNB 10 by the PUCCH after the PUSCH assigned to transmission of the data of the second type.

Step S220 and Step S225 may be inversed in the order of processing or coincide in the timing of processing.

Thus, the gNB 10 can recognize which data is to be transmitted from the UE 20 by the information from the UE 20 and recognize by which channel the UCI is to be transmitted from the UE 20 by the instruction to the UE 20.

According to the foregoing description, the wireless communication system according to the third embodiment includes the terminal (the UE 20) and the base station (the gNB 10). When the timing of transmitting the data and the timing of transmitting the control information (the UCI) overlap with each other, the UE 20 transmits the UCI simultaneously with the data to the gNB 10 using the channel assigned to transmission of the data. In this wireless communication system, the transmitter 21 of the UE 20 transmits the first signal including the information on the type of the data to be transmitted, whereas the receiver 12 of the gNB 10 receives the first signal. The transmitter 11 of the gNB 10 transmits the second signal including the information indicating whether the UCI is able to be transmitted by the channel assigned to transmission of the data to the UE 20 in accordance with the type of the data informed from the UE 20. When the type of the data is the first type (eMBB), the second signal includes the information indicating transmission of the UCI by the resource of the channel (the PUSCH) assigned to transmission of the data. When the type of the data is the second type (URLLC), the second signal includes the information indicating transmission of the UCI by the resource (the PUSCH or the PUCCH) other than the channel (the PUSCH) assigned to transmission of the data. When the type of the data is the second type (URLLC), the transmitter 11 of the gNB 10 transmits the third signal including the information on the resource (the PUSCH or the PUCCH) transmitting the UCI to the UE 20 using the resource (PDCCH) other than the downlink channel (the PDCCH) indicating the PUSCH. The receiver 22 of the UE 20 receives the second and third signals. When the timing of transmitting the data and the timing of transmitting the UCI overlap with each other, the transmitter 21 of the UE 20 transmits the UCI to the gNB 10 in accordance with the pieces of information included in the second and third signals.

Thus, in the wireless communication system according to the third embodiment, when the transmission timings of the data of the second type (URLLC) and the UCI overlap with each other, the gNB 10 instructs the UE 20 to delay the transmission timing of the UCI. The gNB 10 indicates, as the resource other than the channel (the PUSCH) assigned to transmission of the data of the second type (URLLC), the PUSCH (refer to "III" in FIG. 9) or the PUCCH after the channel (the PUSCH), for example. Consequently, the proportion of the uplink data in the PUSCH is ensured. That is to say, the redundancy of the PUSCH is not insufficient. Thus, the wireless communication system according to the third embodiment, when the data for URLLC, which demands high reliability, is transmitted, can ensure a resource to be assigned to the data for URLLC and fulfill a demanded error rate.

[d] Fourth Embodiment

A wireless communication system according to a fourth embodiment assumes a case in which the UE 20 informs the first type as the type of the data, then the data of the second type occurs, and the transmission timing of the UCI and the transmission timing of the data overlap with each other. In this case, in the wireless communication system according to the fourth embodiment, the UE 20 transmits the UCI to the gNB 10 by the PUSCH different from the PUSCH assigned to transmission of the data of the second type. In the fourth embodiment, the same parts as those of the first to the third embodiments are denoted by the same symbols, and descriptions thereof are omitted.

Figure 11:
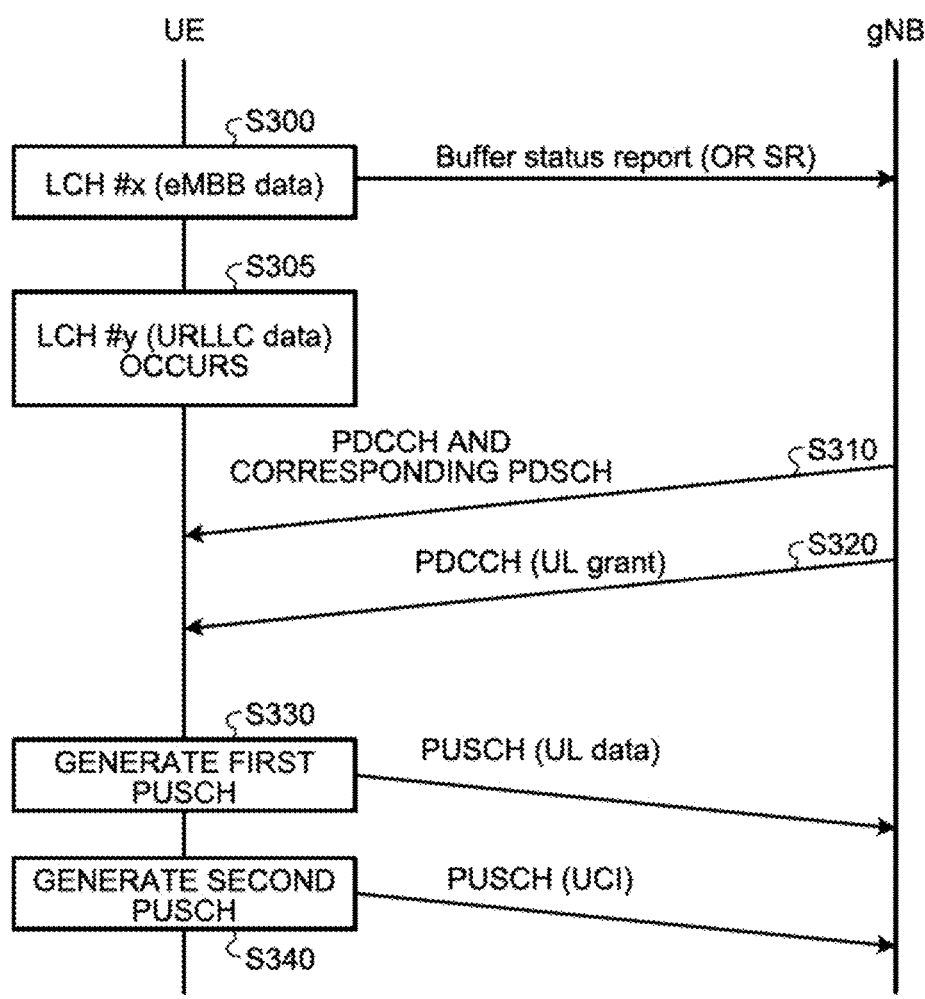
FIG. 11 is a sequential diagram of operation of a wireless communication system according to a fourth embodiment.

FIG. 11 is a sequential diagram of operation of the wireless communication system according to the fourth embodiment.

In LCH #x, the data of the first type ("eMBB data" in FIG. 11) occurs as data to be transmitted, for example. In this case, the transmitter 21 of the UE 20 transmits the first signal including information on the first type (eMBB) as the type of the data to be transmitted to the gNB 10 by Buffer status report or SR (Step S300 in FIG. 11). That is to say, the UE 20 transmits the type of the data desired to be transmitted to the gNB 10.

However, after the processing at Step S300, in an LCH #y, the data of the second type ("URLLC data" in FIG. 11) occurs (Step S305 in FIG. 11).

Next, the transmitter 11 of the gNB 10 transmits the DCI and the data to the UE 20 by the PDCCH and the corresponding PDSCH, respectively (Step S310 in FIG. 11). That is to say, the gNB 10 transmits the downlink data to the UE 20 by the PDSCH and transmits the DCI to the UE 20 by the PDCCH. The DCI includes information on UL grant (PUSCH assignment information) and DL assignment (PDSCH assignment information), for example.

Then, the transmitter 11 of the gNB 10 transmits the second signal including the information indicating whether the UCI is able to be transmitted by the channel assigned to transmission of the data by the PDCCH related to UL grant in accordance with the type of the data informed from the UE 20 (Step S320 in FIG. 11). Then, the type of the data informed from the UE 20 is the first type (eMBB), and thus the second signal includes information indicating transmission of the UCI by a resource of a PUSCH channel (the PUSCH) assigned to transmission of the data of the first type. The receiver 22 of the UE 20 receives the second signal.

Next, in the UE 20, the transmission timing of the UCI and the transmission timing of the data of the second type (URLLC) overlap with each other. In this case, the transmitter 21 of the UE 20 generates a first PUSCH assigned to transmission of the data of the second type (URLLC) and transmits the data of the second type ("UL data" in FIG. 11) to the gNB 10 by the first PUSCH (Step S330 in FIG. 11). The transmitter 21 of the UE 20 generates a second PUSCH different from the first PUSCH assigned to transmission of the data of the second type (URLLC) and transmits the UCI to the gNB 10 by the second PUSCH (Step S340 in FIG. 11). That is to say, the UE 20 transmits the UCI without piggybacked on the first PUSCH at Step S230 and transmits the UCI piggybacked on the second PUSCH at Step S240.

Figure 12:
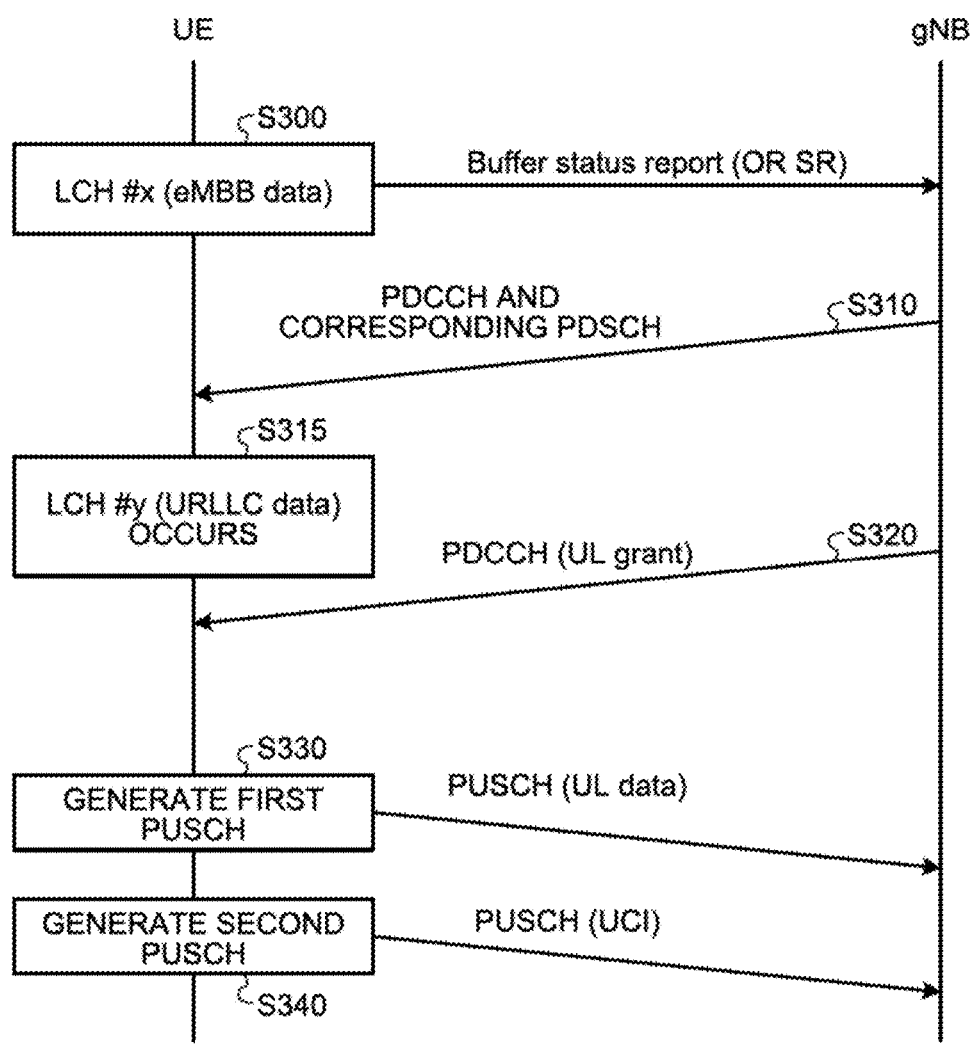
FIG. 12 is a sequential diagram of another operation of the wireless communication system according to the fourth embodiment.

FIG. 12 is a sequential diagram of another operation of the wireless communication system according to the fourth embodiment. In the example illustrated in FIG. 12, a timing of occurrence of the data of the second type (URLLC) in the LCH #y is different from that of the example illustrated in FIG. 11. The data of the second type ("URLLC data" in FIG. 12) occurs in the LCH #y after the processing at Step S310 (Step S315 in FIG. 12), for example. The rest of the processing is the same as the case in FIG. 11.

Figure 13:
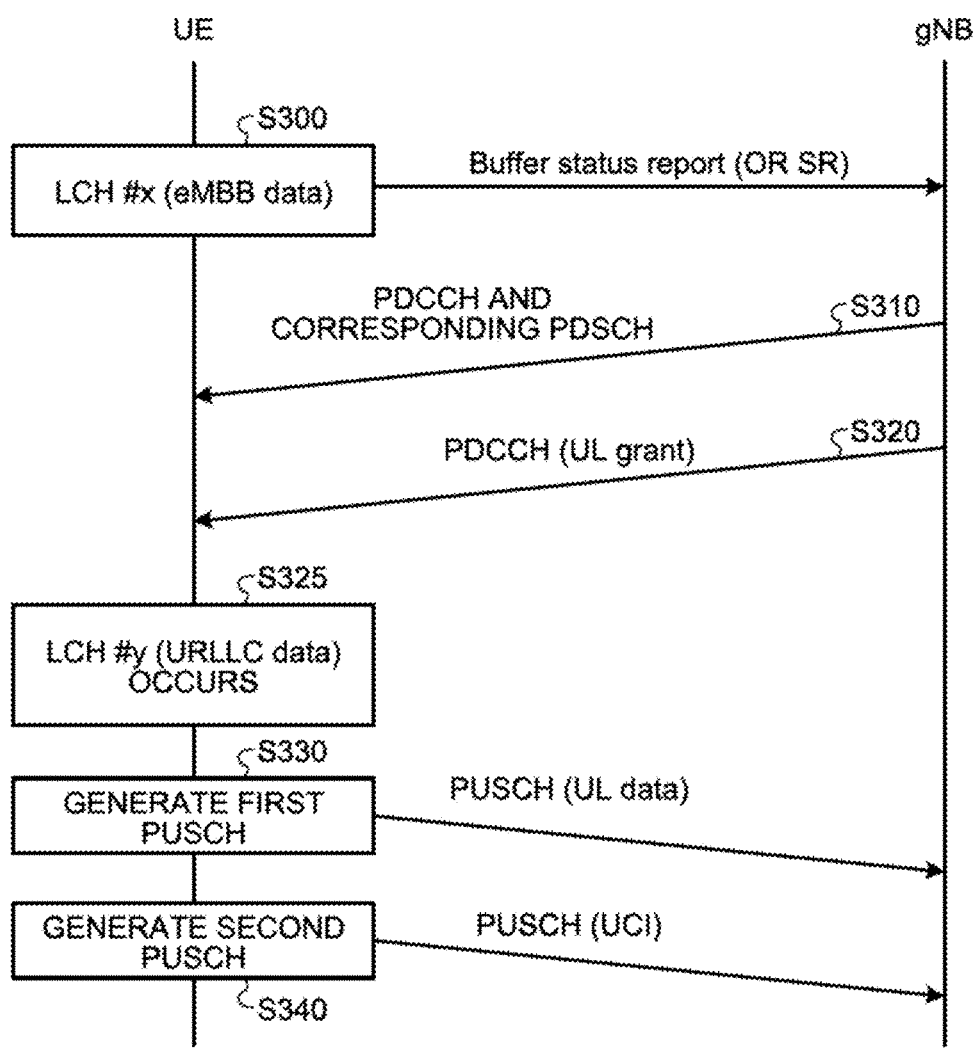
FIG. 13 is a sequential diagram of still another operation of the wireless communication system according to the fourth embodiment.

FIG. 13 is a sequential diagram of still another operation of the wireless communication system according to the fourth embodiment. In the example illustrated in FIG. 13, the timing of occurrence of the data of the second type (URLLC) in the LCH #y is different from those of the examples illustrated in FIG. 11 and FIG. 12. The data of the second type ("URLLC data" in FIG. 13) occurs in the LCH #y after the processing at Step S320 (Step S325 in FIG. 13), for example. The rest of the processing is the same as the case in FIG. 11.

Then, to enable the gNB 10 to recognize the data of the second type (URLLC) transmitted from the UE 20 at Step S330 and the UCI transmitted from the UE 20 at Step S340, DMRS series or placement pattern is used. The DMRS series or the placement pattern represents whether the PUSCH carries the UCI by an orthogonal code, for example.

When the data of the second type (URLLC) is transmitted from the UE 20 at Step S330, the DMRS series or placement pattern of the first PUSCH is determined in advance. The orthogonal code is {+1, +1, +1, +1}, whereby the DMRS series or placement pattern of the first PUSCH represents that the first PUSCH does not carry the UCI, for example.

On the other hand, when the UCI is transmitted from the UE 20 at Step S340, the DMRS series or placement pattern of the second PUSCH is generated by changing the orthogonal code by the UE 20. The orthogonal code is changed to {+1, −1, +1, −1}, whereby the DMRS series or placement pattern of the second PUSCH represents that the second PUSCH carries the UCI, for example.

Thus, the gNB 10 can recognize the data of the second type (URLLC) transmitted from the UE 20 at Step S330 and the UCI transmitted from the UE 20 at Step S340 by the DMRS series or placement pattern.

To enable the gNB 10 to recognize whether the data transmitted from the UE 20 at Step S330 is the data of the second type (URLLC), the following two methods are used.

A first method is a method using modulation and coding scheme (MCS) designated by the PDCCH. The size of the data of URLLC autonomously replaced by the UE 20 is smaller than the size of the data slated to be transmitted by the PUSCH originally assigned for eMBB, for example. In this case, at Step S330, the UE 20 fills the shortage with zero to match the data size and generates the first PUSCH based on the MCS designated by the PDCCH. At Step S330, the UE 20 fills the shortage with the data of eMBB to match the size and generates the first PUSCH based on the MCS designated by the PDCCH. In this case, the UE 20 attaches a header to the data of eMBB to enable the gNB 10 to recognize whether the data transmitted from the UE 20 is the data of the second type (URLLC).

A second method is a method using another MCS different from the MCS designated by the PDCCH. The gNB 10 designates an MCS when the DMRS series or placement pattern represents that the PUSCH does not carry the UCI as the other MCS by RRC in advance, for example. At Step S330, the UE 20 generates the first PUSCH based on the other MCS. Alternatively, the gNB 10 designates size when the data of URLLC is transmitted with the other MCS by RRC in advance. At Step S330, the UE 20 adjusts a coding rate in accordance with an assigned resource based on the other MCS to generate the first PUSCH. Thus, the gNB 10 can discriminate the data of the URLLC.

According to the foregoing description, the wireless communication system according to the fourth embodiment includes the terminal (the UE 20) and the base station (the gNB 10). When the timing of transmitting the data and the timing of transmitting the control information (the UCI) overlap with each other, the UE 20 transmits the UCI simultaneously with the data to the gNB 10 using the channel assigned to transmission of the data. In this wireless communication system, the transmitter 21 of the UE 20 transmits the first signal including the information on the type of the data to be transmitted, whereas the receiver 12 of the gNB 10 receives the first signal. The transmitter 11 of the gNB 10 transmits the second signal including the information indicating whether the UCI is able to be transmitted by the channel assigned to transmission of the data to the UE 20 in accordance with the type of the data informed from the UE 20. When the type of the data is the first type (eMBB), the second signal includes the information indicating transmission of the UCI by the resource of the channel (the PUSCH) assigned to transmission of the data. When the type of the data is the second type (URLLC), the second signal includes the information indicating transmission of the UCI by the resource (the PUSCH or the PUCCH) other than the channel (the PUSCH) assigned to transmission of the data. The UE 20 may transmit the first information including the information indicating the first type as the information on the type of the data, then the data of the second type may occur, and further the timing of transmitting the data and the timing of transmitting the UCI may overlap with each other. In this case, the transmitter 11 of the UE 20 transmits the UCI to the gNB 10 using the resource (the PUSCH) other than the channel (the PUSCH) assigned to transmission of the data of the second type.

Thus, in the wireless communication system according to the fourth embodiment, when the transmission timing of the UCI and the transmission timing of the data overlap with each other, when the type of the data is the second type (URLLC), the UE 20 transmits the UCI to the gNB 10 with the transmission timing of the UCI delayed. In this process, the UE 20 uses the resource (the PUSCH) other than the channel (the PUSCH) assigned to transmission of the data of the second type. Consequently, the proportion of the uplink data in the PUSCH is ensured. That is to say, the redundancy of the PUSCH is not insufficient. Thus, the wireless communication system according to the fourth embodiment, when the data for URLLC, which demands high reliability, is transmitted, can ensure a resource to be assigned to the data for URLLC and fulfill a demanded error rate.

Other Embodiments

The components in the embodiments are not necessarily needed to be physically configured as illustrated. That is to say, specific modes of distribution and consolidation of the parts are not limited to those illustrated, and the whole or part thereof can be configured by functionally or physically distributing or consolidating any units in accordance with various kinds of loads or use conditions.

Further, the whole or any part of various kinds of processing performed by the apparatuses may be executed on a central processing unit (CPU) (or a microcomputer such as a micro processing unit (MPU) or a micro controller unit (MCU)). The whole or any part of the various kinds of processing may be executed on a computer program analytically executed on the CPU (or the microcomputer such as the MPU or the MCU) or on hardware by a wired logic.

The base station 10 and the terminal 20 of the embodiments can be implemented by the following hardware configuration, for example.

Figure 14:
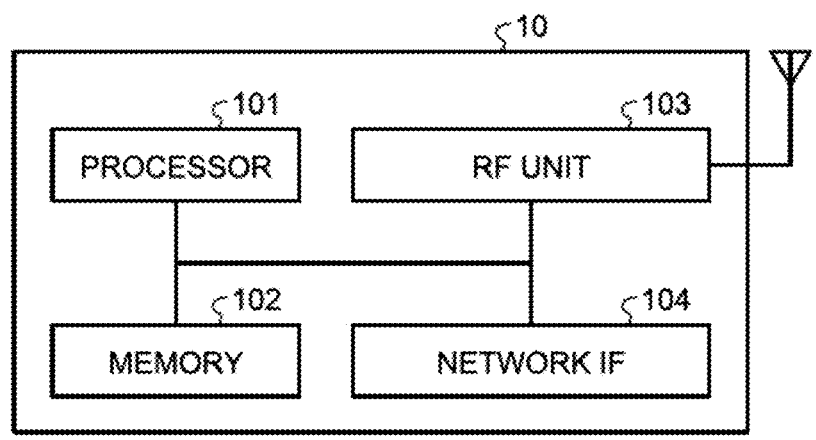
FIG. 14 is a diagram of an exemplary hardware configuration of a base station.

FIG. 14 is a diagram of an exemplary hardware configuration of the base station 10. The base station 10 has a processor 101, a memory 102, a radio frequency (RF) unit 103, and a network interface (IF) 104. Examples of the processor 101 include the CPU, a digital signal processor (DSP), and a field programmable gate array (FPGA). Examples of the memory 102 include a random access memory (RAM) such as a synchronous dynamic random access memory (SDRAM), a read only memory (ROM), and a flash memory.

The various kinds of processing performed by the base station 10 of the embodiments may be implemented by executing computer programs stored in various kinds of memories such as a non-volatile storage medium by the processor 101. That is to say, the memory 102 may store therein computer programs corresponding to respective pieces of processing executed by respective components, and the processor 101 may execute the computer programs. The respective components correspond to the functions of the controller 14. The transmitter 11 and the receiver 12 are implemented by the RF unit 103.

Although one processor 101 executes the various kinds of processing performed by the base station 10 of the embodiments, this is not limiting; a plurality of processors may execute them.

Figure 15:
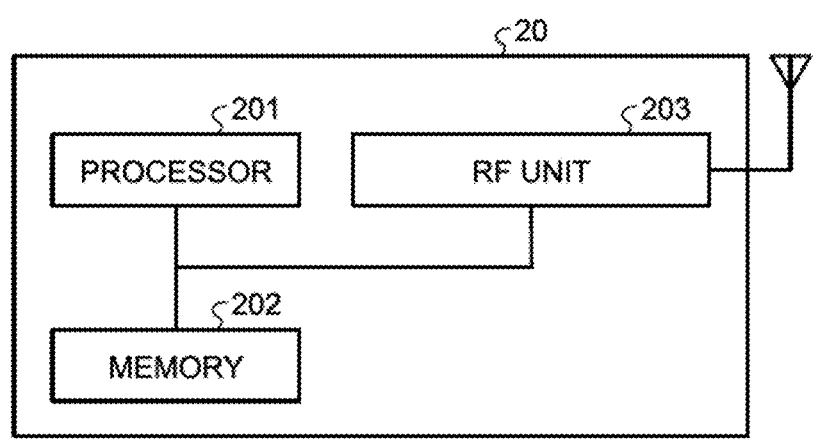
FIG. 15 is a diagram of an exemplary hardware configuration of a terminal.

FIG. 15 is a diagram of an exemplary hardware configuration of the terminal 20. The terminal 20 has a processor 201, a memory 202, and an RF unit 203. Examples of the processor 201 include the CPU, the DSP, and the FPGA. Examples of the memory 202 include the RAM such as the SDRAM, the ROM, and the flash memory.

The various kinds of processing performed by the terminal 20 of the embodiments may be implemented by executing computer programs stored in various kinds of memories such as a non-volatile storage medium by the processor 201. That is to say, the memory 202 may store therein computer programs corresponding to respective pieces of processing executed by respective components, and the processor 201 may execute the computer programs. The respective components correspond to the functions of the controller 24. The transmitter 21 and the receiver 22 are implemented by the RF unit 203.

Although one processor 201 executes the various kinds of processing performed by the terminal 20 of the embodiments, this is not limiting; a plurality of processors may execute them.

One aspect can ensure a resource to be assigned to data demanding high reliability and fulfill a demanded error rate.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication system comprising:
   a base station configured to transmit a first signal including information indicating whether or not control information is able to be transmitted using a first resource which is assigned to transmission of data; and
   a terminal configured to: receive the first signal, transmit, when a first timing of transmitting the data and a second timing of transmitting the control information overlap with each other and the information indicates that the control information is able to be transmitted using the first resource, the control information to the base station using the first resource, and
   transmit, when the first timing and the second timing overlap with each other and the information indicates that the control information is not able to be transmitted using the first resource, the control information to the base station using a second resource which is different from the first resource,
   wherein the information indicates, when the data have a first priority, that the control information is not able to be transmitted using the first resource, and
   the information indicates, when the data have a second priority that is different from the first priority, that the control information is able to be transmitted using the first resource.

2. The wireless communication system according to claim 1, wherein the base station transmits a radio resource control (RRC) signal that configures the second resource, and
   the second resource is a resource of a physical uplink control channel (PUCCH) or a physical uplink shared channel (PUSCH).

3. The wireless communication system according to claim 1, wherein
   the first resource is resource of a physical uplink shared channel (PUSCH) which is assigned to transmission of the data.

4. A base station comprising:
   a transmitter configured to transmit, to a terminal, a first signal including information indicating whether or the control information is able to be transmitted using a first resource which is assigned to transmission of data;
   a receiver configured to: receive, when a first timing of transmitting the data and a second timing of transmitting the control information overlap with each other and the information indicates that the control information is able to be transmitted using the first resource which is assigned to transmission of the data, the control information from the terminal via the first resource, and receive, when the first timing of transmitting the data and the second timing of transmitting the control information overlap with each other and the information indicates that the control information is not able to be transmitted using the first resource, the control information from the terminal via a second resource which is different from the first resource,
   wherein the information indicates, when the data have a first priority, that the control information is not able to be transmitted using the first resource, and
   the information indicates, when the data have a second priority that is different from the first priority, that the control information is able to be transmitted using the first resource.

5. The base station according to claim 4, wherein the transmitter transmits a radio resource control (RRC) signal that configures the second resource other than the first resource, and
   the second resource other than the first resource is a resource of a physical uplink control channel (PUCCH) or a physical uplink shared channel (PUSCH).

6. The base station according to claim 4, wherein the first resource is resource of a physical uplink shared channel (PUSCH) which is assigned to transmission of the data.

7. The base station according to claim 4, wherein the receiver receives, from the terminal, a second signal according to a type of the data.

8. A terminal comprising:
   a receiver configured to receive a first signal from a base station including information indicating whether or not control information is able to be transmitted using a first resource assigned to transmission of data; and
   a transmitter configured to: transmit, when a first timing of transmitting the data and a second timing of transmitting the control information overlap with each other and the information indicates that the control information is able to be transmitted using the first resource, the control information to the base station using the first resource, and
   transmit, when the first timing and the second timing overlap with each other and the information indicates that the control information is not able to be transmitted using the first resource, the control information to the base station using a second resource which is different from the first resource,
   wherein the information indicates, when the data have a first priority, that the control information is not able to be transmitted using the first resource, and the information indicates, when the data have a second priority that is different from the first priority, that the control information is able to be transmitted using the first resource.

9. The terminal according to claim 8, wherein the second resource is a resource of a physical uplink control channel (PUCCH) or a physical uplink shared channel (PUSCH), which is configured by a radio resource control (RRC) signal.

10. The terminal according to claim 8, wherein the first resource is resource of a physical uplink shared channel (PUSCH) which is assigned to transmission of the data.

11. The terminal according to claim 8, wherein the receiver receives information included in a second signal according to a type of the data.

* * * * *